(12) United States Patent
Takado

(10) Patent No.: US 11,057,582 B2
(45) Date of Patent: Jul. 6, 2021

(54) IMAGE SENSING DEVICE AND IMAGE SENSING SYSTEM

(71) Applicant: CANON KABUSHIKI KAISHA, Tokyo (JP)

(72) Inventor: Hisashi Takado, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 6 days.

(21) Appl. No.: 16/223,497

(22) Filed: Dec. 18, 2018

(65) Prior Publication Data

US 2019/0199978 A1 Jun. 27, 2019

(30) Foreign Application Priority Data

Dec. 22, 2017 (JP) .............................. JP2017-246399

(51) Int. Cl.
| | |
|---|---|
| *H04N 5/3745* | (2011.01) |
| *H04N 5/353* | (2011.01) |
| *H04N 5/374* | (2011.01) |
| *H04N 5/376* | (2011.01) |
| *H04N 5/225* | (2006.01) |
| *H04N 5/232* | (2006.01) |
| *H04N 7/18* | (2006.01) |

(52) U.S. Cl.
CPC ....... *H04N 5/37452* (2013.01); *H04N 5/2257* (2013.01); *H04N 5/23227* (2018.08); *H04N 5/3532* (2013.01); *H04N 5/3741* (2013.01); *H04N 5/3765* (2013.01); *H04N 7/188* (2013.01)

(58) Field of Classification Search
CPC ............. H04N 5/23227; H04N 5/3532; H04N 5/3741; H04N 5/3745; H04N 5/37452; H04N 5/3765; H04N 7/188
See application file for complete search history.

(56) References Cited

U.S. PATENT DOCUMENTS

| | | | |
|---|---|---|---|
| 9,900,532 B2 | 2/2018 | Takado et al. | |
| 9,900,535 B2 | 2/2018 | Takado | |
| 9,912,886 B2 | 3/2018 | Shigeta et al. | |
| 10,044,992 B2 | 8/2018 | Takado | |
| 2007/0109433 A1* | 5/2007 | Yamada ................. | H04N 5/232 348/294 |
| 2009/0096916 A1* | 4/2009 | Kim .................... | H04N 5/23245 348/362 |
| 2013/0135486 A1 | 5/2013 | Wan | |

(Continued)

FOREIGN PATENT DOCUMENTS

| | | |
|---|---|---|
| JP | 2013-172208 A | 9/2013 |
| JP | 2017-220750 A | 12/2017 |

*Primary Examiner* — Daniel M Pasiewicz
(74) *Attorney, Agent, or Firm* — Venable LLP

(57) ABSTRACT

An image sensing device includes a plurality of pixels and a receiver configured to receive, from an outside, a trigger signal that gives a first timing and a second timing. Each of the plurality of pixels includes a photoelectric converter, a first charge holding portion configured to hold charges generated by the photoelectric converter, and a second charge holding portion configured to hold charges generated by the photoelectric converter. In each of the plurality of pixels, the charges whose accumulation is started in the photoelectric converter in accordance with the first timing are held by the first charge holding portion, and the charges whose accumulation is started in the photoelectric converter in accordance with the second timing are held by the second charge holding portion.

18 Claims, 22 Drawing Sheets

(56) References Cited

U.S. PATENT DOCUMENTS

| | | |
|---|---|---|
| 2013/0215305 A1 | 8/2013 | Yamashita et al. |
| 2016/0155768 A1* | 6/2016 | Yi .......................... H04N 5/378 250/208.1 |
| 2016/0366350 A1* | 12/2016 | Roffet ............... H01L 27/14612 |
| 2017/0352697 A1 | 12/2017 | Onuki et al. |
| 2018/0098012 A1 | 4/2018 | Takado et al. |
| 2018/0160062 A1 | 6/2018 | Shigeta et al. |

* cited by examiner

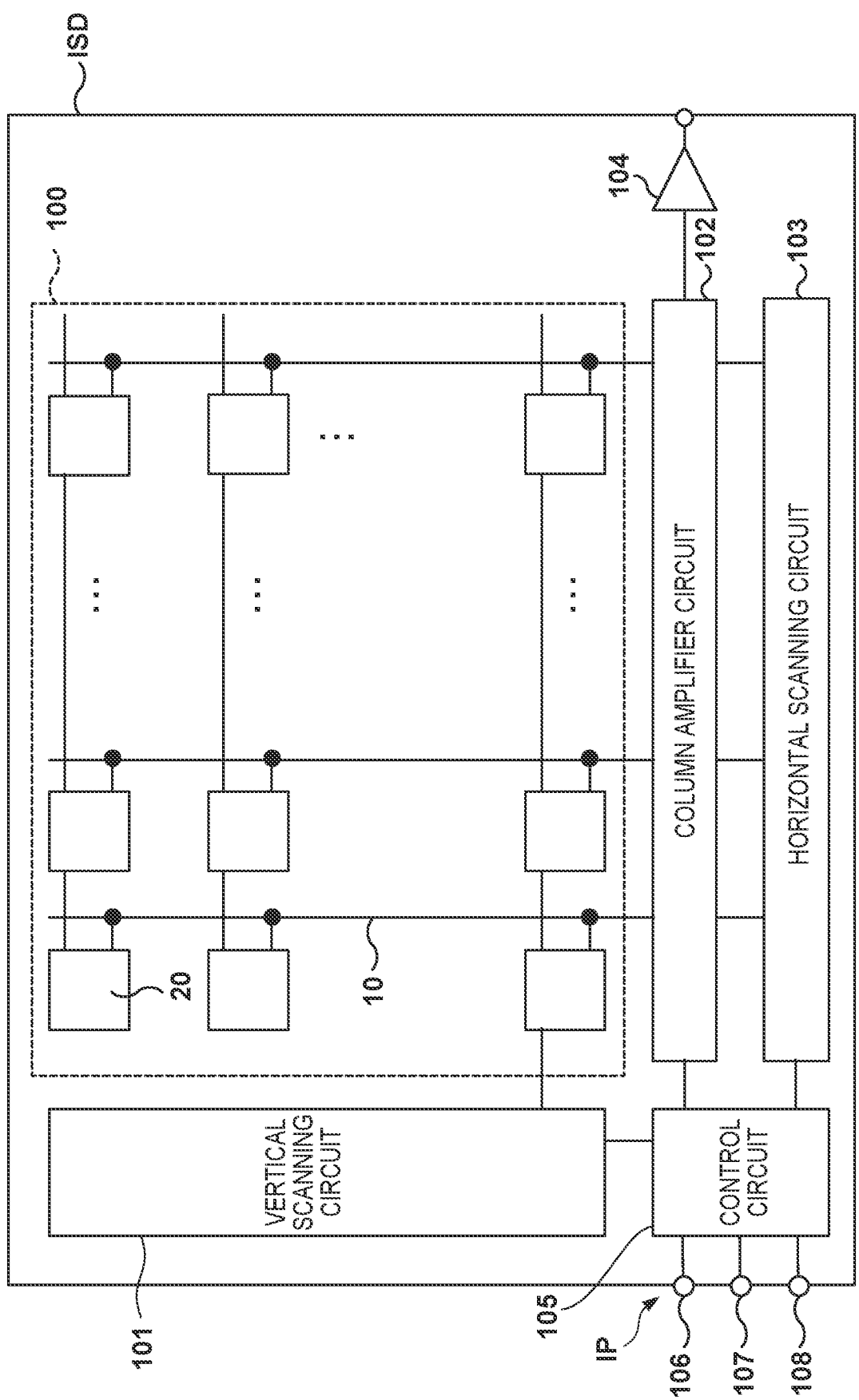

IMAGE SENSING DEVICE AND IMAGE SENSING SYSTEM

BACKGROUND OF THE INVENTION

Field of the Invention

The present invention relates to an image sensing device and an image sensing system.

Description of the Related Art

In recent years, image sensing devices including a plurality of memories in a pixel have been proposed for the purpose of attaining high image quality and/or multiple functions. US-2013-0135486 describes an image sensing device in which each pixel includes a plurality of accumulation nodes to expand the dynamic range. More specifically, each pixel described in US-2013-0135486 includes a photodiode, a first accumulation node, a second accumulation node, a first transfer gate, and a second transfer gate. The first transfer gate transfers charges accumulated in the photodiode during a time TA to the first accumulation node, and the second transfer gate transfers charges accumulated in the photodiode during a time TB to the second accumulation node. In one exposure, a cycle including TA and TB is repeated as times TA, TB, TA, TB . . . .

The image sensing device described in US-2013-0135486 starts image sensing at timings different from each other and is therefore advantageous in, for example, sensing an object that moves at a high speed at timings different from each other. In the image sensing device described in US-2013-0135486, however, arbitrary timings different from each other cannot be given from the outside as the timing of the start of image sensing. Hence, the image sensing device described in US-2013-0135486 cannot start image sensing of an object that moves at a high speed or an object that can arbitrarily appear at each of arbitrary timings that do not synchronize with each other. Examples of the object that moves at a high speed and the object that can arbitrarily appear are an automobile that moves on a road and an article that moves on a conveyor.

SUMMARY OF THE INVENTION

The present invention provides a technique advantageous in starting image sensing of an object that moves at a high speed or an object that can arbitrarily appear at each of arbitrary timings that do not synchronize with each other.

One of aspects of the present invention provides an image sensing device comprises a plurality of pixels, and a receiver configured to receive, from an outside, a trigger signal that gives a first timing and a second timing, wherein each of the plurality of pixels includes a photoelectric converter, a first charge holding portion configured to hold charges generated by the photoelectric converter, and a second charge holding portion configured to hold charges generated by the photoelectric converter, and in each of the plurality of pixels, the charges whose accumulation is started in the photoelectric converter in accordance with the first timing are held by the first charge holding portion, and the charges whose accumulation is started in the photoelectric converter in accordance with the second timing are held by the second charge holding portion.

Further features of the present invention will become apparent from the following description of exemplary embodiments with reference to the attached drawings.

BRIEF DESCRIPTION OF THE DRAWINGS

FIG. 8 is a block diagram showing the schematic arrangement of an image sensing device according to the third embodiment;

DESCRIPTION OF THE EMBODIMENTS

Figure 1:
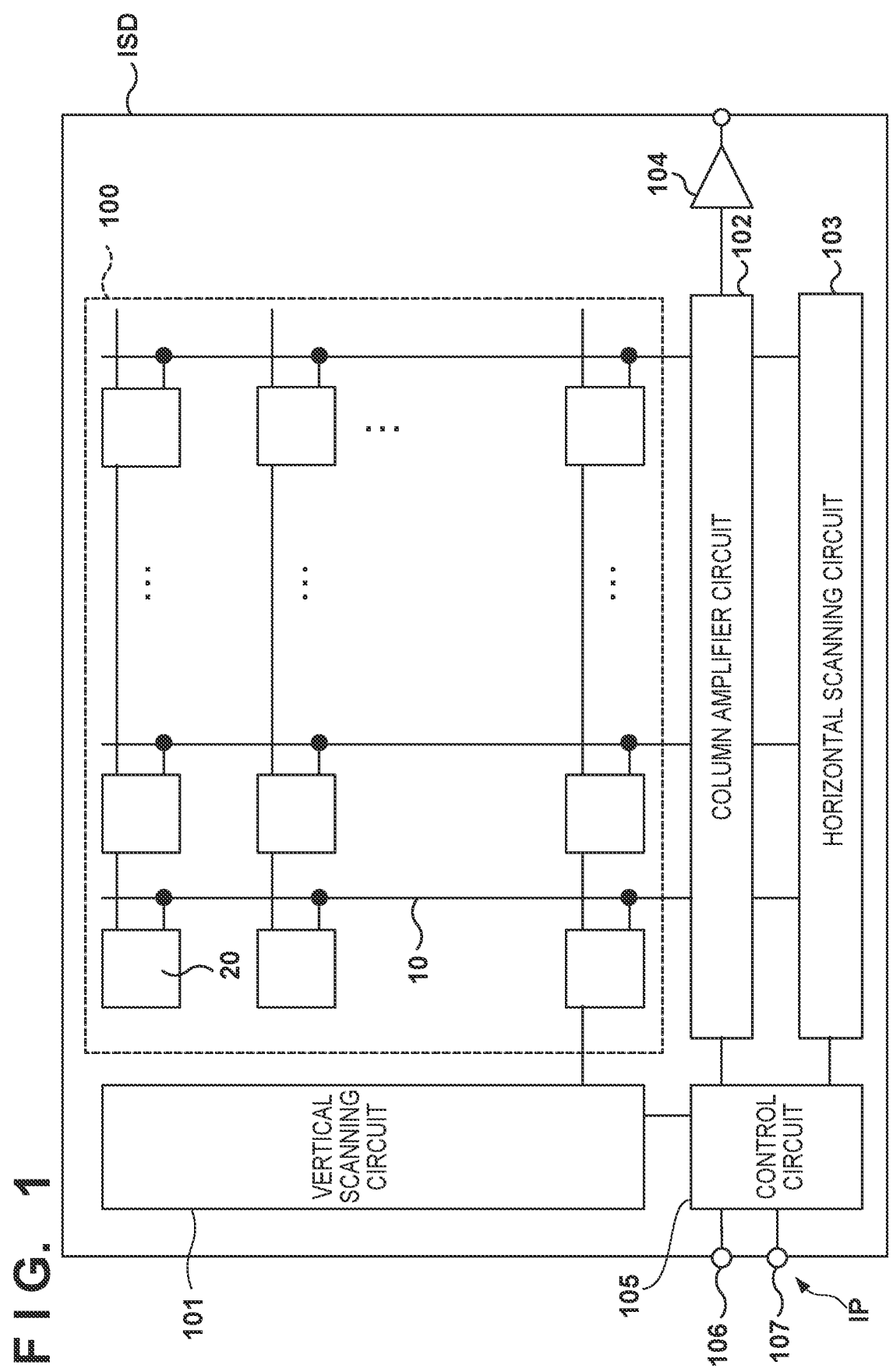
FIG. 1 is a block diagram showing the schematic arrangement of an image sensing device according to the first embodiment.

The present invention will now be described with reference to the accompanying drawings by way of exemplary embodiments. In this specification and the accompanying drawings, a signal line and a signal output to the signal line will sometimes be denoted by the same reference numerals or names.

An image sensing device according to the first embodiment of the present invention will be described with reference to FIGS. 1, 2, 3, 4A, and 4B. FIG. 1 shows the schematic arrangement of an image sensing device ISD according to the first embodiment. The image sensing device ISD can include a pixel array 100, a vertical scanning circuit 101, a column amplifier circuit 102, a horizontal scanning circuit 103, an output circuit 104, a control circuit 105, and a receiver IP. The receiver IP receives, from the outside, trigger signals that give a first timing and a second timing that do not synchronize with each other. The receiver IP can include, for example, a first external trigger terminal (first terminal) 106 and a second external trigger terminal (second terminal) 107. The first external trigger terminal 106 can receive, from the outside, a first external trigger signal (first trigger signal) that gives the first timing. The second external trigger terminal 107 can receive, from the outside, a second external trigger signal (second trigger signal) that gives the second timing. The pixel array 100 includes a plurality of pixels 20 arranged to form a plurality of rows and a plurality of columns. The vertical scanning circuit 101 is a row selection circuit that selects (the pixels 20 of) a read target row of the plurality of rows of the pixel array 100. The vertical scanning circuit 101 drives (the pixels 20 of) the plurality of rows of the pixel array 100. The vertical scanning circuit 101 can include, for example, a logic circuit such as a shift register or an address decoder.

Each of the plurality of rows of the pixel array 100 is provided with a vertical output line 10, and signals from the pixels 20 can be output to the vertical output lines 10. The column amplifier circuit 102 includes a plurality of amplifiers corresponding to the plurality of vertical output lines 10, respectively, and amplifies a plurality of signals to be output to the plurality of vertical output lines 10. The column amplifier circuit 102 can be configured to perform, for example, correlated double sampling processing based on signals at the time of reset of the pixels 20 and signals by the photoelectric conversion of the pixels 20. The horizontal scanning circuit 103 can include, for example, a plurality of switches connected to the plurality of amplifiers of the column amplifier circuit 102, respectively, and a selection circuit configured to generate a plurality of control signals to control the plurality of switches, respectively. The output circuit 104 is formed by, for example, a buffer amplifier, a differential amplifier, and the like, and outputs a signal from the column amplifier circuit 102 to a signal processing unit outside the image sensing device ISD. The column amplifier circuit 102 or the output circuit 104 may be provided with an A/D converter, and a digital image signal may be output from the image sensing device ISD.

The control circuit 105 can control the vertical scanning circuit 101, the column amplifier circuit 102, the horizontal scanning circuit 103, and the output circuit 104. In addition, the control circuit 105 can control the plurality of pixels 20 of the pixel array 100 via the control of the vertical scanning circuit 101. More specifically, the control circuit 105 controls the plurality of pixels 20 of the pixel array 100 via the control of the vertical scanning circuit 101 in accordance with the first external trigger signal and the second external trigger signal supplied from the outside via the first external trigger terminal 106 and the second external trigger terminal 107.

Figure 2:
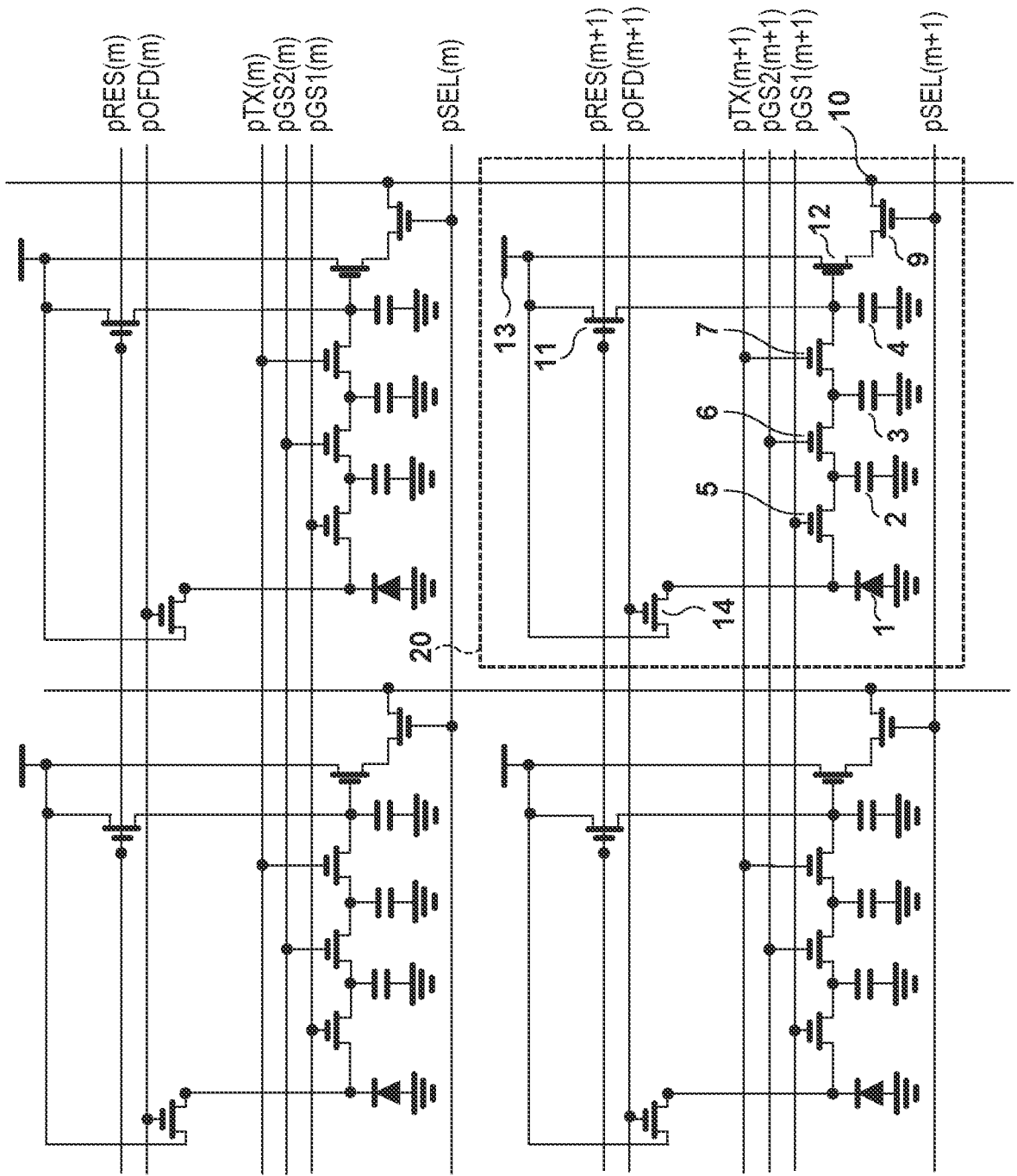
FIG. 2 is a circuit diagram showing an equivalent circuit of the pixels of the image sensing device according to the first embodiment.

FIG. 2 shows the arrangement of a part of the pixel array 100 of the image sensing device ISD. More specifically, FIG. 2 shows 2 rows×2 columns=4 pixels 20 in the pixel array 100. Each of the plurality of pixels 20 can include a photoelectric converter 1, a first charge holding portion 2, a second charge holding portion 3, a floating diffusion (third charge holding portion) 4, a first transfer transistor (first transfer portion) 5, and a second transfer transistor (second transfer portion) 6. Additionally, each of the plurality of pixels 20 can include a third transfer transistor (third transfer portion) 7, a selection transistor 9, a reset transistor 11, an amplification transistor 12, and an overflow transistor 14.

The photoelectric converter 1 is arranged in a semiconductor substrate, photoelectrically converts incident light, and accumulates charges generated by the photoelectric conversion. When a first transfer signal line pGS1 connected to the gate of the first transfer transistor 5 is driven to active level, the first transfer transistor 5 is turned on and transfers the charges in the photoelectric converter 1 to the first charge holding portion 2. The first transfer transistor 5 can be configured to transfer all the charges in the photoelectric converter 1 to the first charge holding portion 2. The first charge holding portion 2 temporarily holds the charges transferred by the first transfer transistor 5. The first charge holding portion 2 can be configured to, for example, have a region that is arranged in the semiconductor substrate in which the photoelectric converter 1 is arranged and changes to a depletion region, and hold the charges in the region.

When a second transfer signal line pGS2 connected to the gate of the second transfer transistor 6 is driven to active level, the second transfer transistor 6 is turned on and transfers the charges held by the first charge holding portion 2 to the second charge holding portion 3. The second transfer transistor 6 can be configured to transfer all the charges held by the first charge holding portion 2 to the second charge holding portion 3. The second charge holding portion 3 temporarily holds the charges transferred by the second transfer transistor 6. The second charge holding portion 3 can be configured to, for example, have a region that is arranged in the semiconductor substrate in which the photoelectric converter 1 and the first charge holding portion 2 are arranged and changes to a depletion region, and hold the charges in the region.

When a third transfer signal line pTX connected to the gate of the third transfer transistor 7 is driven to active level, the third transfer transistor 7 is turned on and transfers the charges held by the second charge holding portion 3 to the floating diffusion (third charge holding portion) 4. The third transfer transistor 7 can be configured to transfer all the charges held by the second charge holding portion 3 to the floating diffusion 4. The floating diffusion 4 can be configured to, for example, have a region that is arranged in the semiconductor substrate in which the photoelectric converter 1, the first charge holding portion 2, and the second charge holding portion 3 are arranged and changes to a depletion region, and hold the charges in the region.

The amplification transistor 12 can form, for example, a source follower circuit together with a current source (not shown) connected to the vertical output line 10 and output a signal corresponding to the voltage of the floating diffusion 4 to the vertical output line 10 via the selection transistor 9. The amplification transistor 12 is a pixel output portion that outputs a signal corresponding to the voltage of the floating diffusion 4. When a reset signal line pRES connected to the gate of the reset transistor 11 is driven to active level, the reset transistor 11 is turned on and can reset the voltage of the floating diffusion 4 to a voltage corresponding to the voltage of a power supply line 13. When a discharge signal line pOFD connected to the gate of the overflow transistor 14 is driven to active level, the overflow transistor 14 is turned on and can discharge the charges accumulated in the photoelectric converter 1 to the power supply line 13.

A common control signal is supplied from the vertical scanning circuit 101 to the pixels 20 of the same row. More specifically, control signal lines pGS1(m), pGS2(m), and pTX(m) are connected to the gates of the first transfer transistors 5, the second transfer transistors 6, and the third transfer transistors 7 of the pixels 20 of the mth row, respectively. In addition, control signal lines pSEL(m), pRES(m), and pOFD(m) are connected to the gates of the selection transistors 9, the reset transistors 11, and the overflow transistors 14 of the pixels 20 of the mth row, respectively. In this example, these transistors are turned on when the voltages of the control signal lines are at high level (active level) and off when the voltages are at low level (inactive level). pGS1(m) can also be called a first transfer signal line, pGS2(m) can also be called a second transfer signal line, pTX(m) can also be called a third transfer signal line, pSEL(m) can also be called a selection signal line, pRES(m) can also be called a reset signal line, and pOFD(m) can also be called a discharge signal line.

Figure 3:
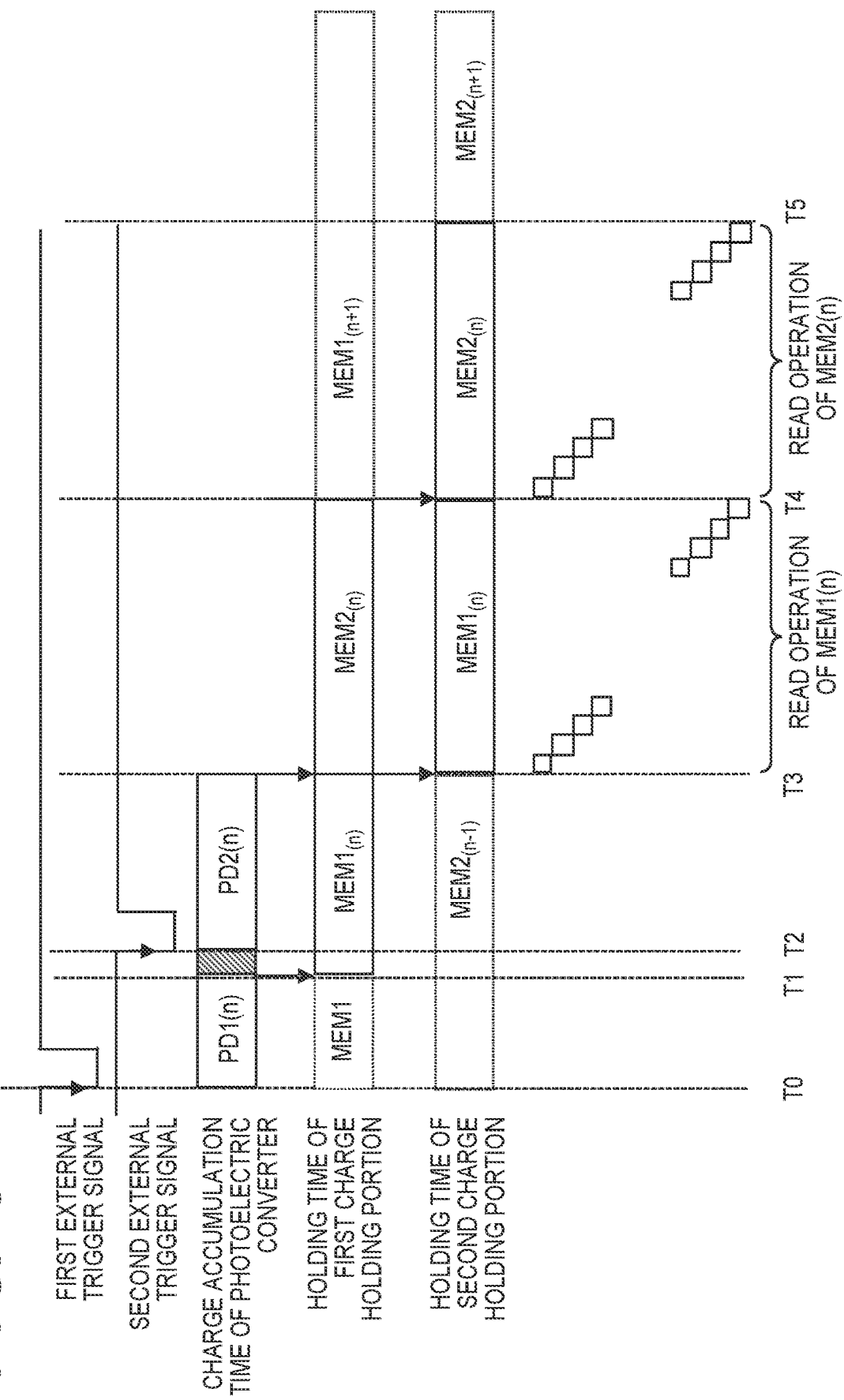
FIG. 3 is a timing chart conceptually showing the operation of the image sensing device according to the first embodiment.

A driving method of the image sensing device ISD according to the first embodiment will be described next with reference to FIG. 3. FIG. 3 conceptually shows the driving method of the image sensing device ISD according to the first embodiment. Referring to FIG. 3, the arrow from the photoelectric converter to the first charge holding portion means transfer of charges in a global electronic shutter operation. In FIG. 3, operations concerning the nth frame are indicated by solid lines, and operations concerning the (n+1)th frame and the (n−1)th frame are indicated by broken lines. The driving method of the image sensing device ISD is the same in the nth frame and the (n+1)th frame. Hence, in this specification, a description will be made while placing focus mainly on the operation of the nth frame.

At time T0, the control circuit 105 detects the trailing edge of the first external trigger signal (pulse signal) supplied to the first external trigger terminal 106, accordingly generates a first trigger pulse, and causes the photoelectric converter 1 to start accumulating charges with reference to the first trigger pulse. At time T1, the control circuit 105 causes the photoelectric converter 1 to transfer charges PD1($n$) accumulated in it during the period from time T0 to time T1 to the first charge holding portion 2 via the first transfer transistor 5 and causes the first charge holding portion 2 to hold the charges. This transfer is performed at once in all the pixels 20 of the pixel array 100. In FIG. 3, the charges held by the first charge holding portion 2 are represented by MEM1($n$). When the transfer ends at time T1, the control circuit 105 causes the photoelectric converter 1 to discharge the charges to the power supply line 13 via the overflow transistor 14.

At time T2, the control circuit 105 detects the trailing edge of the second external trigger signal (pulse signal) supplied to the second external trigger terminal 107, accordingly generates a second trigger pulse, and causes the photoelectric converter 1 to start accumulating charges with reference to the second trigger pulse. At time T3, the control circuit 105 causes the first charge holding portion 2 to transfer the charges (the charges MEM1($n$) whose accumulation is started in accordance with the first trigger pulse and which are then transferred to the first charge holding portion 2) held by the first charge holding portion 2 to the second charge holding portion 3 via the second transfer transistor 6. After that, the control circuit 105 causes the photoelectric converter 1 to transfer charges PD2($n$) accumulated in it during the period from time T2 to time T3 to the first charge holding portion 2 via the first transfer transistor 5 and causes the first charge holding portion 2 to hold the charges. This transfer is performed at once in all the pixels 20 of the pixel array 100.

The control circuit 105 controls a read operation such that a signal corresponding to the charges MEM1($n$) whose accumulation is started in accordance with the first trigger pulse is row-sequentially read out from the second charge holding portion 3 during the period from the transfer end time of time T3 to time T4. The read operation is performed by controlling the vertical scanning circuit 101, the column amplifier circuit 102, the horizontal scanning circuit 103, and the output circuit 104 by the control circuit 105.

At time T4, the control circuit 105 causes the first charge holding portion 2 to transfer the charges (charges MEM2($n$) whose accumulation is started in accordance with the second trigger pulse and which are then transferred to the first charge holding portion 2) held by the first charge holding portion 2 to the second charge holding portion 3 via the second transfer transistor 6. This transfer is performed at once in all the pixels 20 of the pixel array 100.

The control circuit 105 controls the read operation such that the charges MEM2($n$) whose accumulation is started in accordance with the second trigger pulse are row-sequentially read out from the second charge holding portion 3 during the period from the transfer end time of time T4 to time T5. The read operation is performed by controlling the vertical scanning circuit 101, the column amplifier circuit 102, the horizontal scanning circuit 103, and the output circuit 104 by the control circuit 105.

The driving method of the image sensing device ISD according to the first embodiment will be described next in more detail with reference to FIGS. 4A and 4B. Note that in the following explanation of timing charts, a control signal used to control the pixels 20 of the mth row will be described with (m) added to the end of the name of the control signal. When making a description without particularly distinction between rows, a description will be made without adding a character to the end of the control signal name.

Figure 4A:
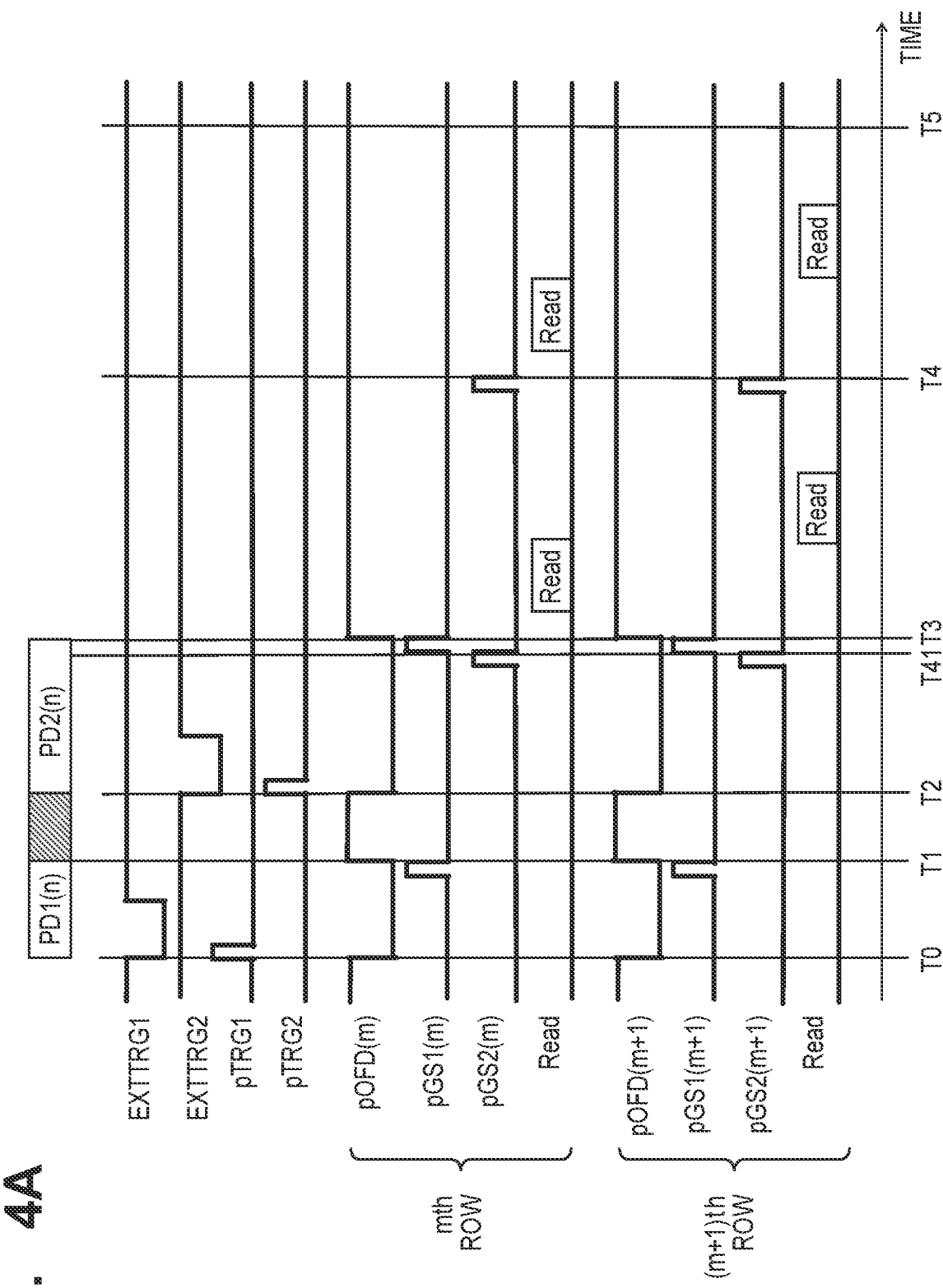
FIGS. 4A and 4B are timing charts showing the operation of the image sensing device according to the first embodiment.

As shown in FIG. 4A, at time T0, the control circuit 105 detects the trailing edge of a first external trigger signal EXTTRG1 supplied to the first external trigger terminal 106, and accordingly generates a first trigger pulse pTRG1. According to the leading edge of the first trigger pulse pTRG1, the voltage of the discharge signal line pOFD transitions from high level to low level, and the overflow transistor 14 is turned off. Accordingly, the photoelectric converter 1 starts accumulating charges corresponding to incident light. Based on a charge accumulation time defined by a parameter value set in the register (not shown) of the image sensing device ISD, the control circuit 105 controls pulse driving of the first transfer signal line pGS1 such that the voltage of the first transfer signal line pGS1 transitions from high level to low level at time T1. Accordingly, at time T1, the first transfer transistor 5 is turned off, and the charge transfer from the photoelectric converter 1 to the first charge holding portion 2 ends.

At time T2, the control circuit 105 detects the trailing edge of a second external trigger signal EXTTRG2 supplied to the second external trigger terminal, and accordingly generates a second trigger pulse pTRG2. According to the leading edge of the second trigger pulse pTRG2, the voltage of the discharge signal line pOFD transitions from high level to low level, and the overflow transistor 14 is turned off. Accordingly, the photoelectric converter 1 starts (resumes) accumulating charges corresponding to incident light. Based on a charge accumulation time defined by a parameter value set in the register (not shown) of the image sensing device ISD, the control circuit 105 controls pulse driving of the first transfer signal line pGS1 such that the voltage of the first transfer signal line pGS1 transitions from high level to low level at time T3. Accordingly, at time T3, the first transfer transistor 5 is turned off, and the charge transfer from the photoelectric converter 1 to the first charge holding portion 2 ends.

In addition, at time T41 before time T3, the control circuit 105 controls pulse driving of the second transfer signal line pGS2 such that the voltage of the second transfer signal line pGS2 transitions from high level to low level. Accordingly, after the charge transfer from the first charge holding portion 2 to the second charge holding portion 3 is started, at time T41, the second transfer transistor 6 is turned off, and the transfer from the first charge holding portion 2 to the second charge holding portion 3 ends.

During the period from time T3 to time T4, the control circuit 105 controls the read operation of the signal corresponding to the charges transferred to the second charge holding portion 3 and held by the second charge holding portion 3. This read operation is performed for the pixels 20 of all rows of the pixel array 100. The read operation will be described later with reference to FIG. 4B.

At time T4, the control circuit 105 controls pulse driving of the second transfer signal line pGS2 such that the voltage of the second transfer signal line pGS2 transitions from high level to low level. Accordingly, after the charge transfer from the first charge holding portion 2 to the second charge holding portion 3 is started, at time T4, the second transfer transistor 6 is turned off, and the transfer from the first charge holding portion 2 to the second charge holding portion 3 ends.

During the period from time T4 to time T5, the control circuit 105 controls the read operation of the signal corresponding to the charges transferred to the second charge holding portion 3 and held by the second charge holding portion 3. This read operation is performed for the pixels 20 of all rows of the pixel array 100.

Figure 4B:
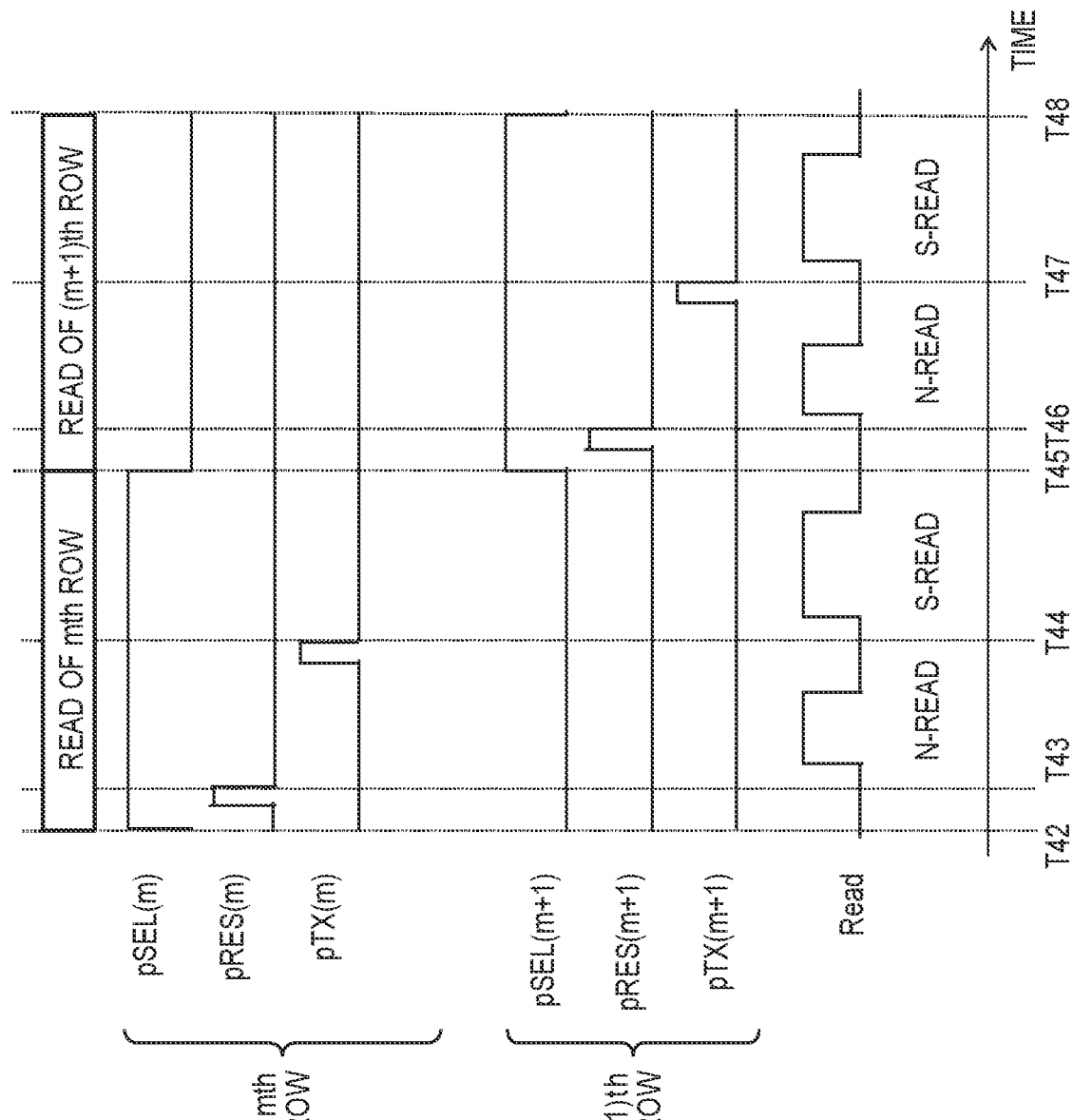
Figure 5:
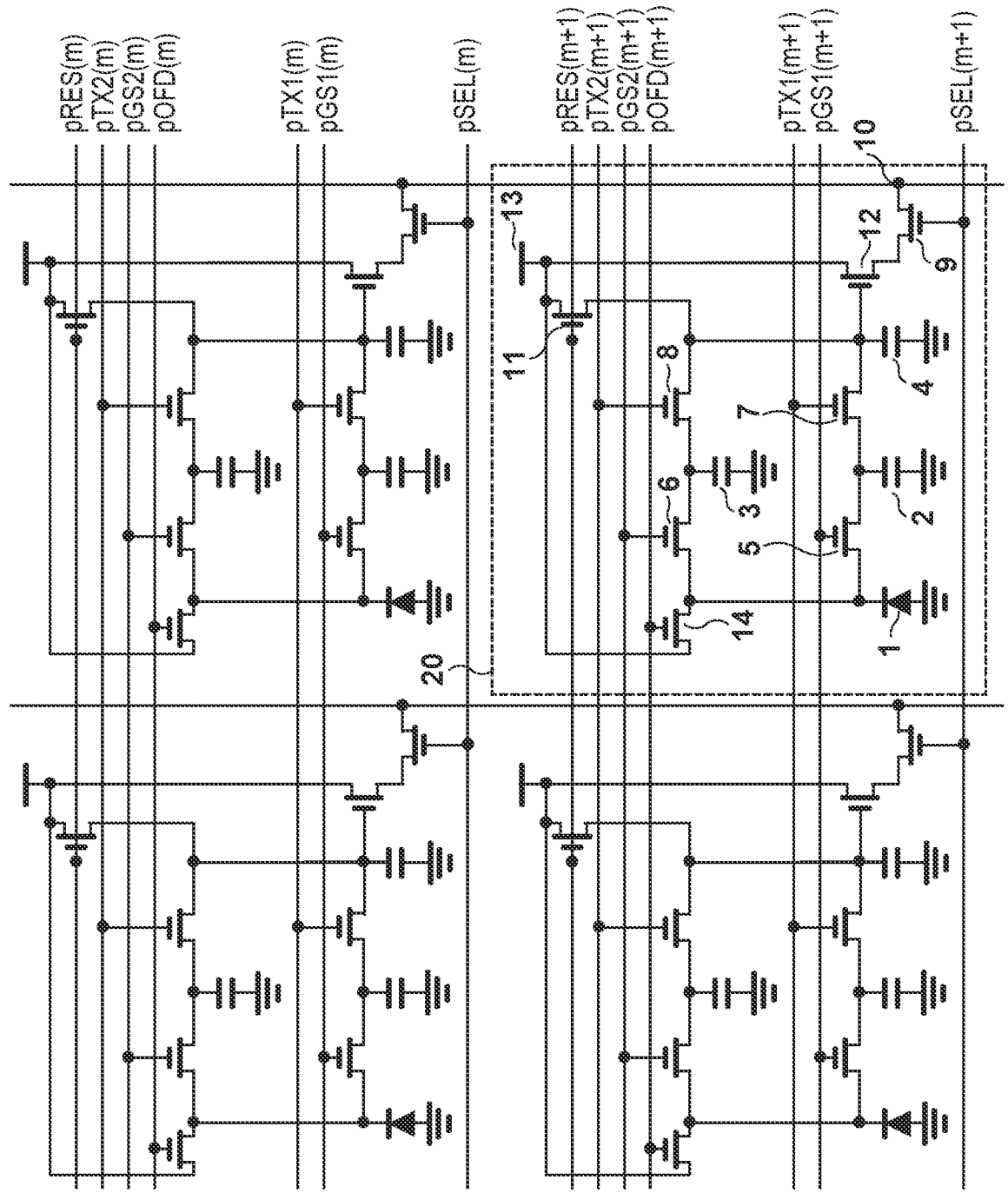
FIG. 5 is a circuit diagram showing an equivalent circuit of the pixels of an image sensing device according to the second embodiment.

FIG. 4B shows the read operation from the pixels 20 of the mth row and the (m+1)th row. At time T42, the control circuit 105 makes the voltage of the selection signal line pSEL(m) transition from low level to high level via the vertical scanning circuit 101. The pixels 20 of the mth row are thus selected. Halfway through the period from time T42 to time T43, the control circuit 105 makes the voltage of the reset signal line pRES(m) transition to high level and turns on the reset transistor 11 by the control via the vertical scanning circuit 101. At time T43, the control circuit 105 makes the voltage of the reset signal line pRES(m) transition to low level and turns off the reset transistor 11 by the control via the vertical scanning circuit 101. With this operation, the charges existing in the floating diffusion 4 are discharged to the power supply line 13. The voltage (noise signal) of the floating diffusion 4 is amplified by the source follower operation and output to the vertical output line 10.

During the period from time T43 to time T44, the control circuit 105 causes the column amplifier circuit 102 to read out the noise signal (N-read). After that, the control circuit 105 makes the voltage of the third transfer signal line pTX1(m) transition to high level and turns on the third transfer transistor 7 by control via the vertical scanning circuit 101. The charges MEM1(n) of the nth frame are thus transferred from the second charge holding portion 3 that holds the charges of the pixels 20 of the mth row to the floating diffusion 4. The voltage (optical signal) of the floating diffusion 4 is amplified by the source follower operation and output to the vertical output line 10. At time T44, the control circuit 105 turns off the voltage of the third transfer signal line pTX1(m) by control via the vertical scanning circuit 101.

During the period from time T44 to time T45, the control circuit 105 causes the column amplifier circuit 102 to read out the optical signal corresponding to the charges MEM1 (n) (S-read). At time T45, the control circuit 105 makes the voltage of the selection signal line pSEL(m) transition to low level by control via the vertical scanning circuit 101, thereby ending selection of the mth row. In addition, at time T45, the control circuit 105 makes the voltage of a selection signal line pSEL(m+1) transition to high level, thereby starting selection of the (m+1)th row.

In the first embodiment, detection of an object is executed by an external device different from the image sensing device ISD, and a detection signal representing the detection of the object can be supplied from the external device to the first and second external trigger terminals of the image sensing device ISD. The timing at which the object enters the image sensing range of the image sensing device ISD and the start of image sensing by the pixels 20 of the image sensing device ISD (the start of charge accumulation) can thus be synchronized with each other. In addition, two external trigger terminals are provided in the image sensing device ISD to allow the image sensing device ISD to independently receive two external trigger signals, thereby controlling the interval of the charge accumulation start timings asynchronously with the period of the read operation. In addition, one charge holding portion is caused to hold charges accumulated in correspondence with the first trigger pulse, and the other charge holding portion is caused to hold charges accumulated in correspondence with the second trigger pulse. This enables continuous image sensing even in a case in which the interval of image sensing is shorter than the interval of the read operation.

Additionally, in this embodiment, since the charge transfer from the photoelectric converter to the charge holding portion is performed at once in all the pixels, all the pixels have the same charge accumulation period, and the effect of a global electronic shutter without any distortion of the object can be obtained. However, the operation may be changed to a rolling shutter operation.

In the above-described example, the trigger pulse is generated by detecting the trailing edge of the external trigger signal. However, the trigger pulse is generated by detecting the leading edge of the external trigger signal.

An image sensing device according to the second embodiment of the present invention will be described with reference to FIGS. 5, 6, and 7A to 7C. Matters that are not mentioned as the second embodiment can comply with the first embodiment. An image sensing device ISD according to the second embodiment is different from that of the first embodiment in that a first charge holding portion 2 and a second charge holding portion 3 are connected in parallel.

Each of a plurality of pixels 20 can include a photoelectric converter 1, the first charge holding portion 2, the second charge holding portion 3, a floating diffusion (third charge holding portion) 4, a first transfer transistor (first transfer portion) 5, and a second transfer transistor (second transfer portion) 6. Additionally, each of the plurality of pixels 20 includes a third transfer transistor (third transfer portion) 7, a fourth transfer transistor (fourth transfer portion) 8, a selection transistor 9, a reset transistor 11, an amplification transistor 12, and an overflow transistor 14.

The photoelectric converter 1 is arranged in a semiconductor substrate, photoelectrically converts incident light, and accumulates charges generated by the photoelectric conversion. When a first transfer signal line pGS1 connected to the gate of the first transfer transistor 5 is driven to active level, the first transfer transistor 5 is turned on and transfers the charges in the photoelectric converter 1 to the first charge holding portion 2. The first transfer transistor 5 can be configured to transfer all the charges in the photoelectric converter 1 to the first charge holding portion 2. The first charge holding portion 2 temporarily holds the charges transferred by the first transfer transistor 5. The first charge holding portion 2 can be configured to, for example, have a region that is arranged in the semiconductor substrate in which the photoelectric converter 1 is arranged and changes to a depletion region, and hold the charges in the region.

When a second transfer signal line pGS2 connected to the gate of the second transfer transistor 6 is driven to active level, the second transfer transistor 6 is turned on and transfers the charges in the photoelectric converter 1 to the second charge holding portion 3. That is, when the second transfer signal line pGS2 connected to the gate of the second transfer transistor 6 is driven to active level, the second transfer transistor 6 is turned on and transfers the charges in the photoelectric converter 1 to the second charge holding portion 3 without an intervention of the first charge holding portion 2. The second transfer transistor 6 can be configured to transfer all the charges in the photoelectric converter 1 to the second charge holding portion 3. The second charge holding portion 3 temporarily holds the charges transferred by the second transfer transistor 6. The second charge holding portion 3 can be configured to, for example, have a region that is arranged in the semiconductor substrate in which the photoelectric converter 1 and the first charge holding portion 2 are arranged and changes to a depletion region, and hold the charges in the region.

When a third transfer signal line pTX1 connected to the gate of the third transfer transistor 7 is driven to active level, the third transfer transistor 7 is turned on and transfers the charges held by the first charge holding portion 2 to the floating diffusion (third charge holding portion) 4. The third transfer transistor 7 can be configured to transfer all the charges held by the first charge holding portion 2 to the floating diffusion 4. The floating diffusion 4 can be configured to, for example, have a region that is arranged in the semiconductor substrate in which the photoelectric converter 1, the first charge holding portion 2, and the second charge holding portion 3 are arranged and changes to a depletion region, and hold the charges in the region.

When a fourth transfer signal line pTX2 connected to the gate of the fourth transfer transistor 8 is driven to active level, the fourth transfer transistor 8 is turned on and transfers the charges held by the second charge holding portion 3 to the floating diffusion (third charge holding portion) 4. The fourth transfer transistor 8 can be configured to transfer all the charges held by the second charge holding portion 3 to the floating diffusion 4.

The amplification transistor 12 forms a source follower circuit together with a current source (not shown) connected to a vertical output line 10 and outputs a signal corresponding to the voltage of the floating diffusion 4 to the vertical output line 10 via the selection transistor 9. When a reset signal line pRES connected to the gate of the reset transistor 11 is driven to active level, the reset transistor 11 is turned on and resets the voltage of the floating diffusion 4 to a voltage corresponding to the voltage of a power supply line 13. When a discharge signal line pOFD connected to the gate of the overflow transistor 14 is driven to active level, the overflow transistor 14 is turned on and discharges the charges accumulated in the photoelectric converter 1 to the power supply line 13.

A common control signal is supplied from a vertical scanning circuit 101 to the pixels 20 of the same row. More specifically, control signal lines pGS1($m$), pGS2($m$), pTX1($m$), and pTX2($m$) are connected to the gates of the first transfer transistors 5, the second transfer transistors 6, the third transfer transistors 7, and the fourth transfer transistors 8 of the pixels 20 of the mth row, respectively. More specifically, control signal lines pSEL(m), pRES(m), and pOFD(m) are connected to the gates of the selection transistors 9, the reset transistors 11, and the overflow transistors 14 of the pixels 20 of the mth row, respectively. In this example, these transistors are turned on when the voltages of the control signal lines are at high level (active level) and off when the voltages are at low level (inactive level). pGS1($m$) is also called a first transfer signal line, pGS2($m$) is also called a second transfer signal line, pTX1($m$) is also called a third transfer signal line, pTX2($m$) is also called a fourth transfer signal line, pSEL(m) is also called a selection signal line, pRES(m) is also called a reset signal line, and pOFD (m) is also called a discharge signal line.

Figure 6:
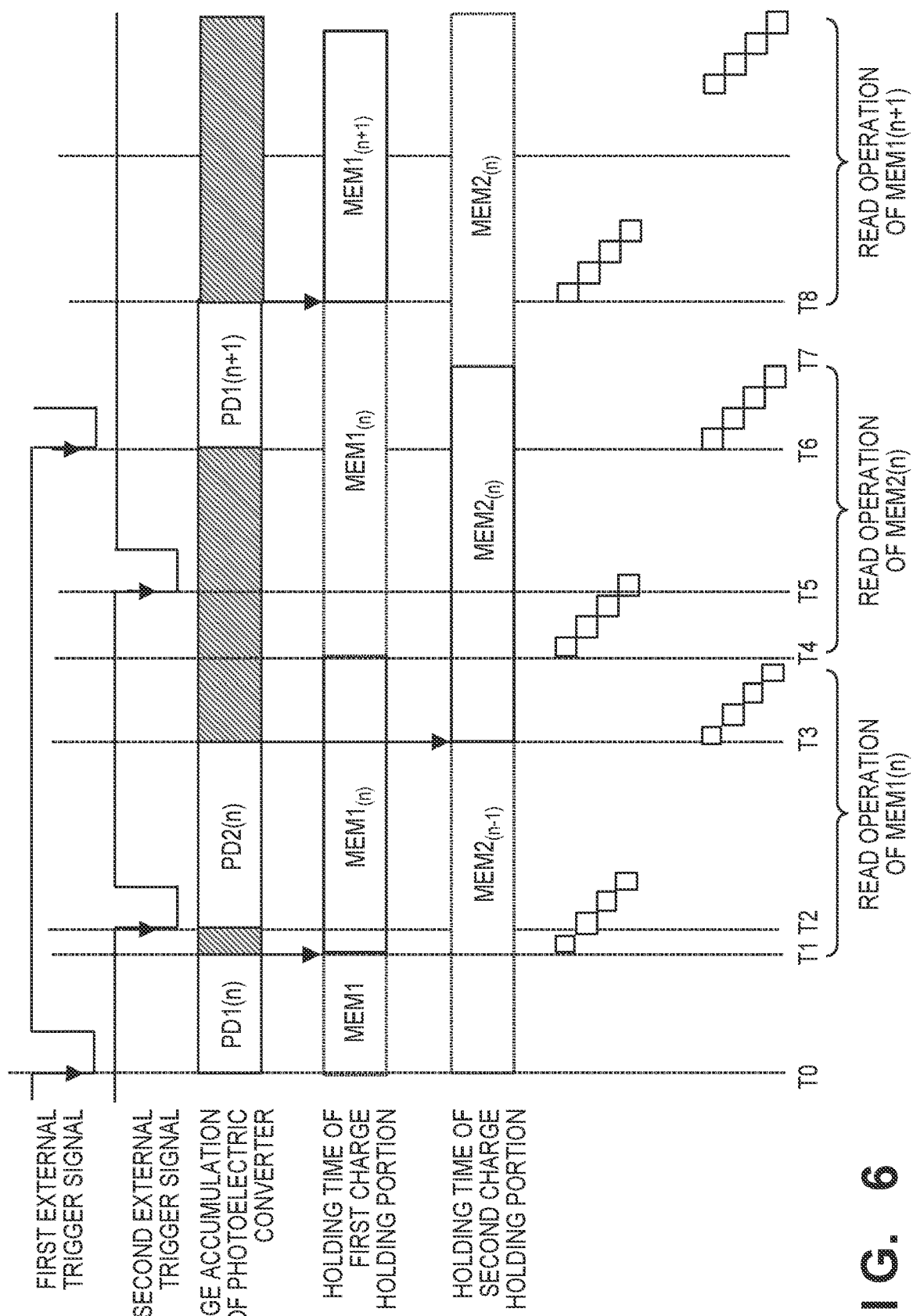
FIG. 6 is a timing chart conceptually showing the operation of the image sensing device according to the second embodiment.

A driving method of the image sensing device ISD according to the second embodiment will be described next with reference to FIG. 6. FIG. 6 conceptually shows the driving method of the image sensing device ISD according to the second embodiment. Referring to FIG. 6, the arrow from the photoelectric converter to the first and second charge holding portions means transfer of charges in a global electronic shutter operation. In FIG. 6, operations concerning the nth frame are indicated by solid lines, and operations concerning the (n+1)th frame and the (n−1)th frame are indicated by broken lines. The driving method of the image sensing device ISD is the same in the nth frame and the (n+1)th frame. Hence, in this specification, a description will be made while placing focus mainly on the operation of the nth frame.

The image sensing device ISD according to the second embodiment is different from the image sensing device ISD according to the first embodiment in that the charge accumulation period according to the second external trigger signal supplied to a second external trigger terminal 107 and at least part of the read operation period of the signal corresponding to the charges held by the first charge holding portion can overlap.

At time T0, a control circuit 105 detects the trailing edge of a first external trigger signal supplied to a first external trigger terminal 106, accordingly generates a first trigger pulse, and causes the photoelectric converter 1 to start accumulating charges with reference to the first trigger pulse. At time T1, the control circuit 105 causes the photoelectric converter 1 to transfer charges PD1($n$) accumulated in it during the period from time T0 to time T1 to the first charge holding portion 2 via the first transfer transistor 5 and causes the first charge holding portion 2 to hold the charges. This transfer is performed at once in all the pixels 20 of a pixel array 100. In FIG. 6, the charges held by the first charge holding portion 2 are represented by MEM1($n$). When the transfer ends at time T1, the control circuit 105 causes the photoelectric converter 1 to discharge the charges to the power supply line 13 via the overflow transistor 14. The control circuit 105 controls the read operation such that the charges MEM1($n$) whose accumulation is started in accordance with the first trigger pulse are row-sequentially read out from the first charge holding portion 2 during the period from the transfer end time of time T1 to time T4. The read operation is performed by controlling the vertical scanning circuit 101, a column amplifier circuit 102, a horizontal scanning circuit 103, and an output circuit 104 by the control circuit 105.

At time T2, the control circuit 105 detects the trailing edge of the second external trigger signal (pulse signal) supplied to the second external trigger terminal 107, accordingly generates a second trigger pulse, and causes the photoelectric converter 1 to start accumulating charges with reference to the second trigger pulse. At time T3, the control circuit 105 causes the photoelectric converter 1 to transfer charges PD2(n) accumulated in it during the period from time T2 to time T3 to the second charge holding portion 3 via the second transfer transistor 6 and causes the second charge holding portion 3 to hold the charges. This transfer is performed at once in all the pixels 20 of the pixel array 100. In FIG. 6, the charges held by the second charge holding portion 3 are represented by MEM2(n). When the transfer ends at time T3, the control circuit 105 causes the photoelectric converter 1 to discharge the charges to the power supply line 13 via the overflow transistor 14.

At time T3, the read operation of the signal corresponding to the charges MEM1(n) and the charge accumulation according to the second external trigger signal supplied to the second external trigger terminal 107 are performed in parallel. This is implemented by connecting the first charge holding portion 2 and the second charge holding portion 3 in parallel.

At time T4, the read operation of the signal corresponding to the charges MEM1(n) ends, and the read operation of the signal corresponding to the charges MEM2(n) starts next. During the period from time T4 to time T7, the read operation of the signal corresponding to the charges MEM2(n) is performed.

At time T5, the second external trigger signal supplied to the second external trigger terminal 107 changes to low level. However, since the read operation of the signal corresponding to the charges MEM2(n) is executed at time T5, the control circuit 105 does not cause the image sensing device ISD to resume accumulation of charges. On the other hand, at time T6 after the end of the read operation of the signal corresponding to the charges MEM1(n), the control circuit 105 detects the trailing edge of the second external trigger signal supplied to the first external trigger terminal. According to this detection, the control circuit 105 generates a first trigger pulse and causes the photoelectric converter 1 to start accumulating charges with reference to the first trigger pulse.

At time T8, the control circuit 105 causes the photoelectric converter 1 to transfer charges PD1(n+1) accumulated in it during the period from time T0 to time T1 to the first charge holding portion 2 via the first transfer transistor 5 and causes the first charge holding portion 2 to hold the charges. This transfer is performed at once in all the pixels 20 of the pixel array 100. In FIG. 6, the charges newly held by the first charge holding portion 2 are represented by MEM1(n+1). When the transfer ends at time T8, the control circuit 105 causes the photoelectric converter 1 to discharge the charges to the power supply line 13 via the overflow transistor 14. In addition, after the end of the transfer at time T8, the control circuit 105 controls the read operation such that the charges MEM1(n+1) are row-sequentially read out from the first charge holding portion 2. The read operation is performed by controlling the vertical scanning circuit 101, the column amplifier circuit 102, the horizontal scanning circuit 103, and the output circuit 104 by the control circuit 105.

Figure 7A:
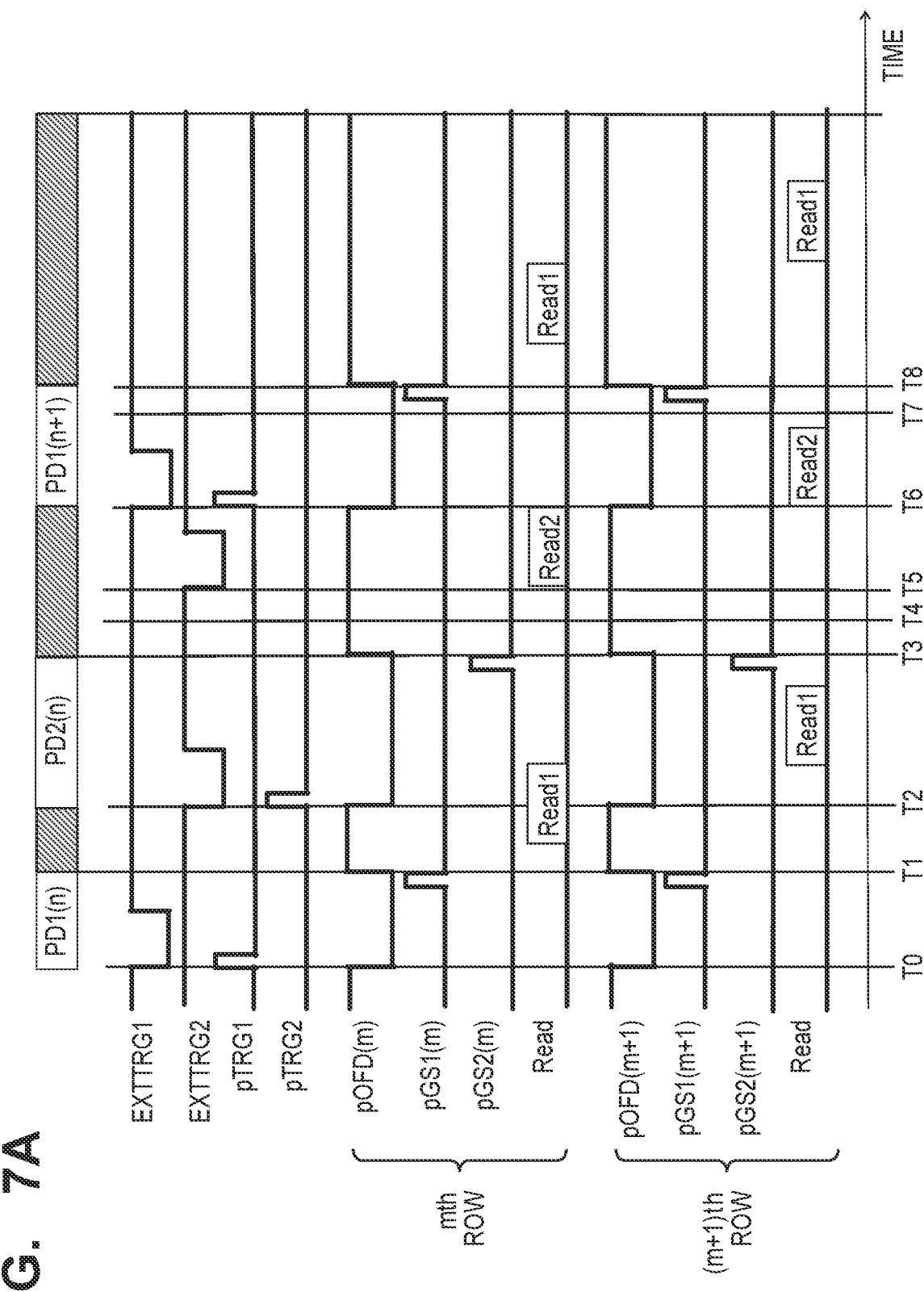
FIGS. 7A to 7C are timing charts showing the operation of the image sensing device according to the second embodiment.

The driving method of the image sensing device ISD according to the second embodiment will be described next in more detail with reference to FIGS. 7A to 7C. As shown in FIG. 7A, at time T0, the control circuit 105 detects the trailing edge of a first external trigger signal EXTTRG1 supplied to the first external trigger terminal 106, and accordingly generates a first trigger pulse pTRG1. According to the leading edge of the first trigger pulse pTRG1, the voltage of the discharge signal line pOFD transitions from high level to low level, and the overflow transistor 14 is turned off. Accordingly, the photoelectric converter 1 starts accumulating charges corresponding to incident light. Based on a charge accumulation time defined by a parameter value set in the register (not shown) of the image sensing device ISD, the control circuit 105 controls pulse driving of the first transfer signal line pGS1 such that the voltage of the first transfer signal line pGS1 transitions from high level to low level at time T1. Accordingly, at time T1, the first transfer transistor 5 is turned off, and the charge transfer from the photoelectric converter 1 to the first charge holding portion 2 ends.

During the period from time T1 to time T4, the control circuit 105 controls the read operation of the signal corresponding to the charges transferred to the first charge holding portion 2 and held by the first charge holding portion 2. This read operation is performed for the pixels 20 of all rows of the pixel array 100. The read operation will be described later with reference to FIG. 7B.

At time T2, the control circuit 105 detects the trailing edge of a second external trigger signal EXTTRG2 supplied to the second external trigger terminal, and accordingly generates a second trigger pulse pTRG2. According to the leading edge of the second trigger pulse pTRG2, the voltage of the discharge signal line pOFD transitions from high level to low level, and the overflow transistor 14 is turned off. Accordingly, the photoelectric converter 1 starts (resumes) accumulating charges corresponding to incident light. Based on a charge accumulation time defined by a parameter value set in the register (not shown) of the image sensing device ISD, the control circuit 105 controls pulse driving of the second transfer signal line pGS2 such that the voltage of the second transfer signal line pGS2 transitions from high level to low level at time T3. Accordingly, at time T3, the second transfer transistor 6 is turned off, and the charge transfer from the photoelectric converter 1 to the second charge holding portion 3 ends.

At time T4, the read operation of the signal corresponding to the charges MEM1(n) ends for all rows. During the period from time T4 to time T7, the control circuit 105 controls the read operation of the signal corresponding to the charges transferred to the second charge holding portion 3 and held by the second charge holding portion 3. This read operation is performed for the pixels 20 of all rows of the pixel array 100. The read operation will be described later with reference to FIG. 7C.

At time T5, the second external trigger signal supplied to the second external trigger terminal (EXTTRG2) changes to low level. However, since the read operation of the signal corresponding to the charges MEM2(n) is executed at time T5, the control circuit 105 does not generate the second trigger pulse. This prevents the charges from being transferred from the photoelectric converter 1 to the second charge holding portion 3 during the period of the read operation from the second charge holding portion 3. For the first external trigger signal supplied to the first external trigger terminal (EXTTRG1) as well, during the read operation from the first charge holding portion 2, the control circuit 105 does not generate the first trigger pulse even when the first external trigger terminal changes to low level.

Here, the control circuit 105 can be configured to neglect the external trigger signal that can cause charge transfer to a charge holding portion during the period of the read operation from the charge holding portion. However, more exactly, the conflict between the period of the read operation from the charge holding portion and charge transfer to the charge holding portion is caused by transferring charges to the charge holding portion before the end of the read operation from the charge holding portion. Hence, the control circuit 105 may be configured to, for example, specify the end time of the charge accumulation period based on the charge accumulation time defined by a parameter value set in the register (not shown) and not to generate the trigger pulse in a case in which the end time is within the period of the read operation.

At time T6, the control circuit 105 detects the trailing edge of the first external trigger signal EXTTRG1 supplied to the first external trigger terminal 106, and accordingly generates the first trigger pulse pTRG1. According to the leading edge of the first trigger pulse pTRG1, the voltage of the discharge signal line pOFD transitions from high level to low level, and the overflow transistor 14 is turned off. Accordingly, the photoelectric converter 1 starts accumulating charges corresponding to incident light. Based on a charge accumulation time defined by a parameter value set in the register (not shown) of the image sensing device ISD, the control circuit 105 controls pulse driving of the first transfer signal line pGS1 such that the voltage of the first transfer signal line pGS1 transitions from high level to low level at time T8. Accordingly, at time T8, the first transfer transistor 5 is turned off, and the charge transfer from the photoelectric converter 1 to the first charge holding portion 2 ends.

Figure 7B:
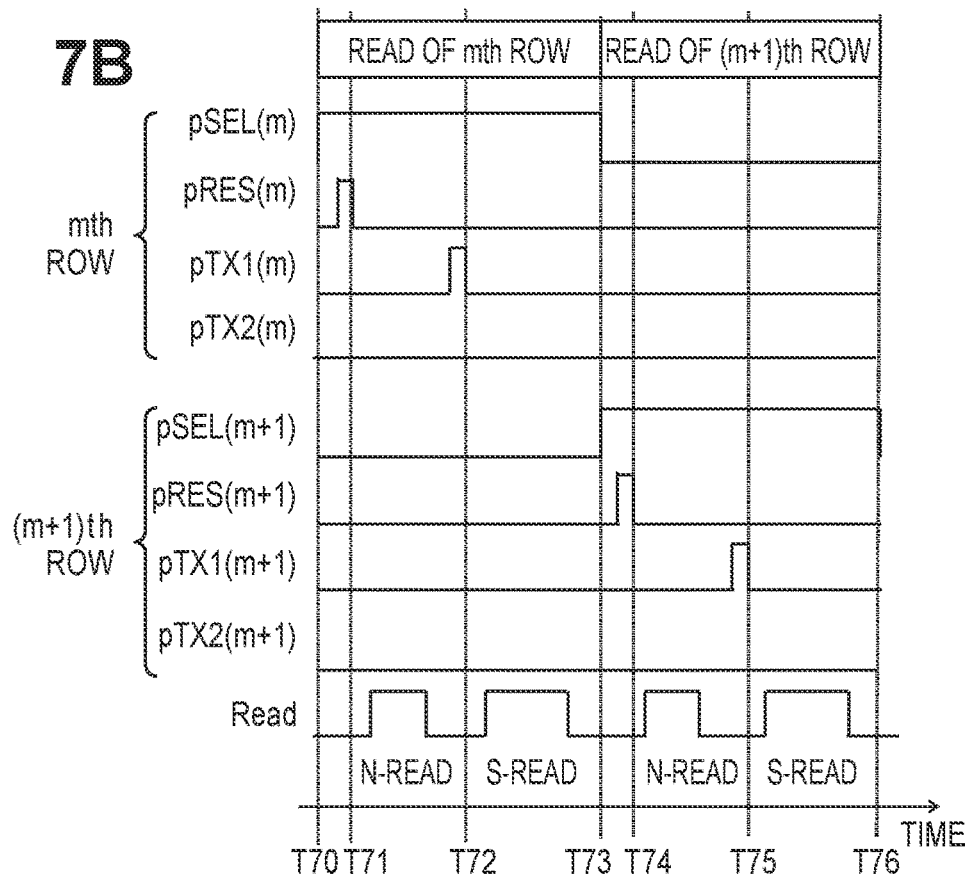

FIG. 7B shows the read operation (Read1 in FIG. 7A) from the first charge holding portions 2 of the pixels 20 of the mth row and the (m+1)th row. At time T70, the control circuit 105 makes the voltage of the selection signal line pSEL(m) transition from low level to high level via the vertical scanning circuit 101. The pixels 20 of the mth row are thus selected. Halfway through the period from time T70 to time T71, the control circuit 105 makes the voltage of the reset signal line pRES(m) transition to high level and turns on the reset transistor 11 by the control via the vertical scanning circuit 101. At time T71, the control circuit 105 makes the voltage of the reset signal line pRES(m) transition to low level and turns off the reset transistor 11 by the control via the vertical scanning circuit 101. With this operation, the charges existing in the floating diffusion 4 are discharged to the power supply line 13. The voltage (noise) signal of the floating diffusion 4 is amplified by the source follower operation and output to the vertical output line 10.

During the period from time T71 to time T72, the control circuit 105 causes the column amplifier circuit 102 to read out the noise signal (N-read). After that, the control circuit 105 makes the voltage of the third transfer signal line pTX1(m) transition to high level and turns on the third transfer transistor 7 by the control via the vertical scanning circuit 101. The charges MEM1(n) (the charges accumulated in accordance with the first trigger pulse) of the nth frame are thus transferred from the first charge holding portion 2 that holds the charges of the pixels 20 of the mth row to the floating diffusion 4. The voltage (optical signal) of the floating diffusion 4 is amplified by the source follower operation and output to the vertical output line 10. At time T72, the control circuit 105 turns off the voltage of the third transfer signal line pTX1(m) by control via the vertical scanning circuit 101.

During the period from time T72 to time T73, the control circuit 105 causes the column amplifier circuit 102 to read out the optical signal corresponding to the charges MEM1(n) (S-read). At time T73, the control circuit 105 makes the voltage of the selection signal line pSEL(m) transition to low level by control via the vertical scanning circuit 101, thereby ending selection of the mth row. In addition, at time T73, the control circuit 105 makes the voltage of a selection signal line pSEL(m+1) transition to high level, thereby starting selection of the (m+1)th row.

Figure 7C:
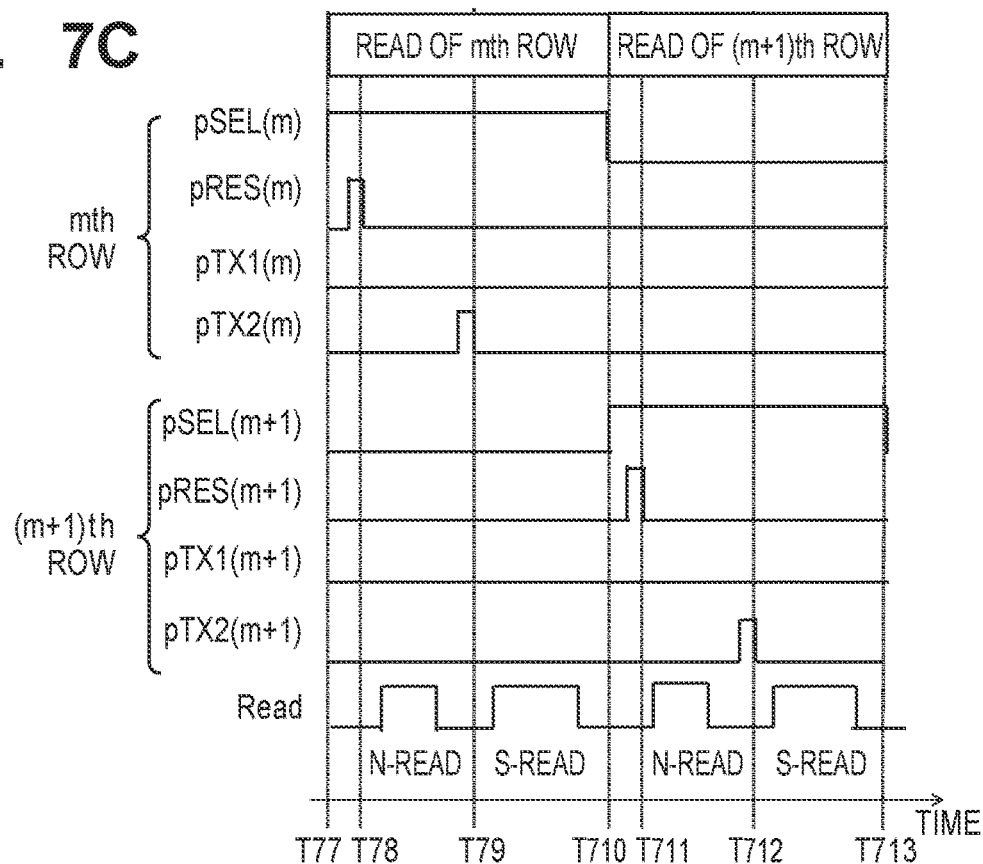

FIG. 7C shows the read operation (Read2 in FIG. 7A) from the first charge holding portions 2 of the pixels 20 of the mth row and the (m+1)th row. At time T77, the control circuit 105 makes the voltage of the selection signal line pSEL(m) transition from low level to high level via the vertical scanning circuit 101. The pixels 20 of the mth row are thus selected. Halfway through the period from time T77 to time T78, the control circuit 105 makes the voltage of the reset signal line pRES(m) transition to high level and turns on the reset transistor 11 by the control via the vertical scanning circuit 101. At time T78, the control circuit 105 makes the voltage of the reset signal line pRES(m) transition to low level and turns off the reset transistor 11 by the control via the vertical scanning circuit 101. With this operation, the charges existing in the floating diffusion 4 are discharged to the power supply line 13. The voltage (noise) signal of the floating diffusion 4 is amplified by the source follower operation and output to the vertical output line 10.

During the period from time T78 to time T79, the control circuit 105 causes the column amplifier circuit 102 to read out the noise signal (N-read). After that, the control circuit 105 makes the voltage of the fourth transfer signal line pTX2(m) transition to high level and turns on the fourth transfer transistor 8 by control via the vertical scanning circuit 101. The charges MEM1(n) (the charges accumulated in accordance with the second trigger pulse) of the nth frame are thus transferred from the second charge holding portion 3 that holds the charges of the pixels 20 of the mth row to the floating diffusion 4. The voltage (optical signal) of the floating diffusion 4 is amplified by the source follower operation and output to the vertical output line 10. At time T79, the control circuit 105 turns off the voltage of the fourth transfer signal line pTX2(m) by control via the vertical scanning circuit 101.

During the period from time T79 to time T710, the control circuit 105 causes the column amplifier circuit 102 to read out the optical signal corresponding to the charges MEM1(n) (S-read). At time T710, the control circuit 105 makes the voltage of the selection signal line pSEL(m) transition to low level by control via the vertical scanning circuit 101, thereby ending selection of the mth row. In addition, at time T710, the control circuit 105 makes the voltage of a selection signal line pSEL(m+1) transition to high level, thereby starting selection of the (m+1)th row.

According to the second embodiment, the read operation of the signal corresponding to the charges accumulated in accordance with the first external trigger signal and accumulation of the charges according to the second external trigger signal are performed in parallel. Hence, the second embodiment is advantageous for shortening the interval between image sensing and image sensing. In other words, the second embodiment is advantageous for an application purpose in which the external trigger signals are more frequency supplied.

Figure 9:
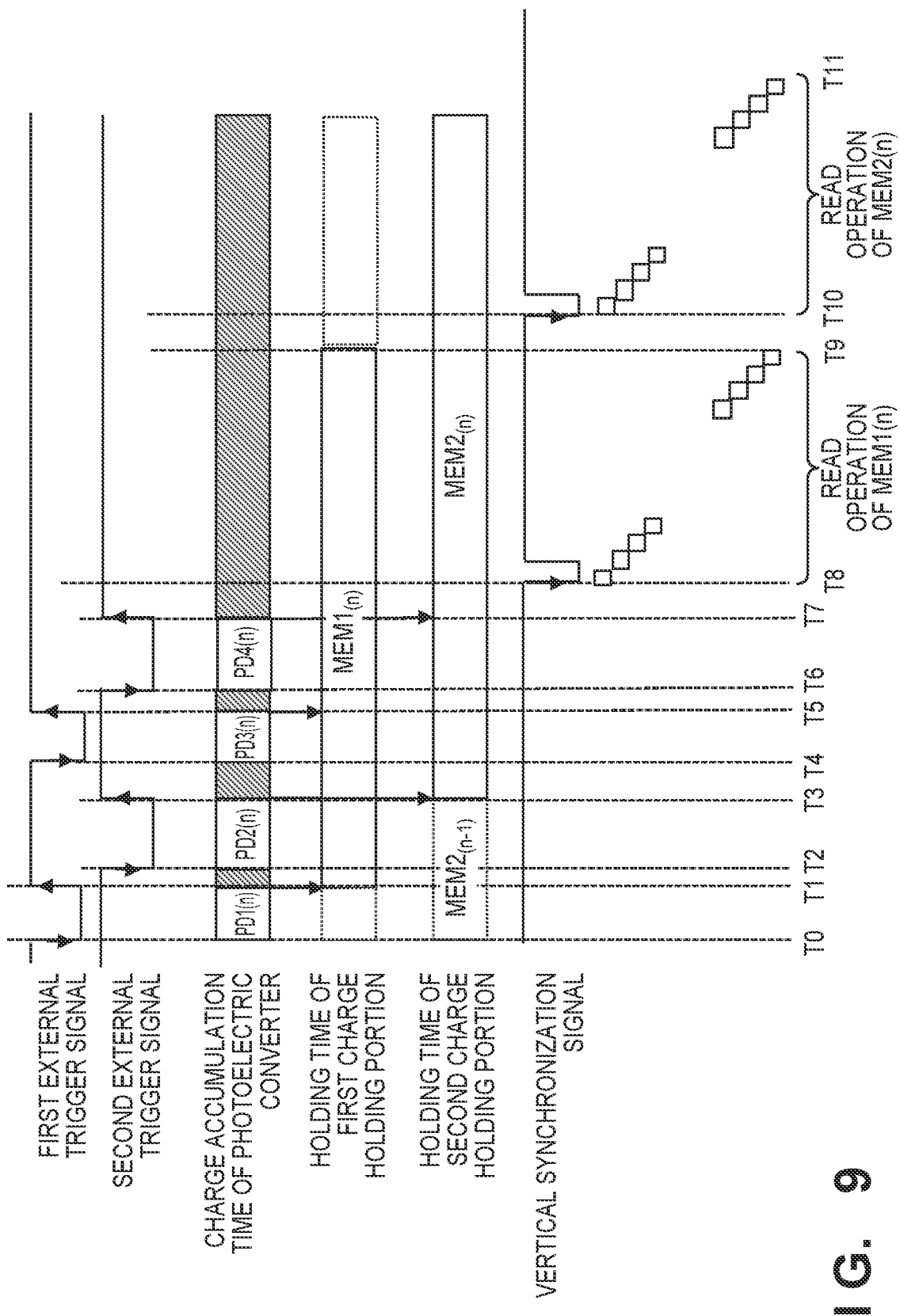
FIG. 9 is a timing chart conceptually showing the operation of the image sensing device according to the third embodiment.
Figure 10:
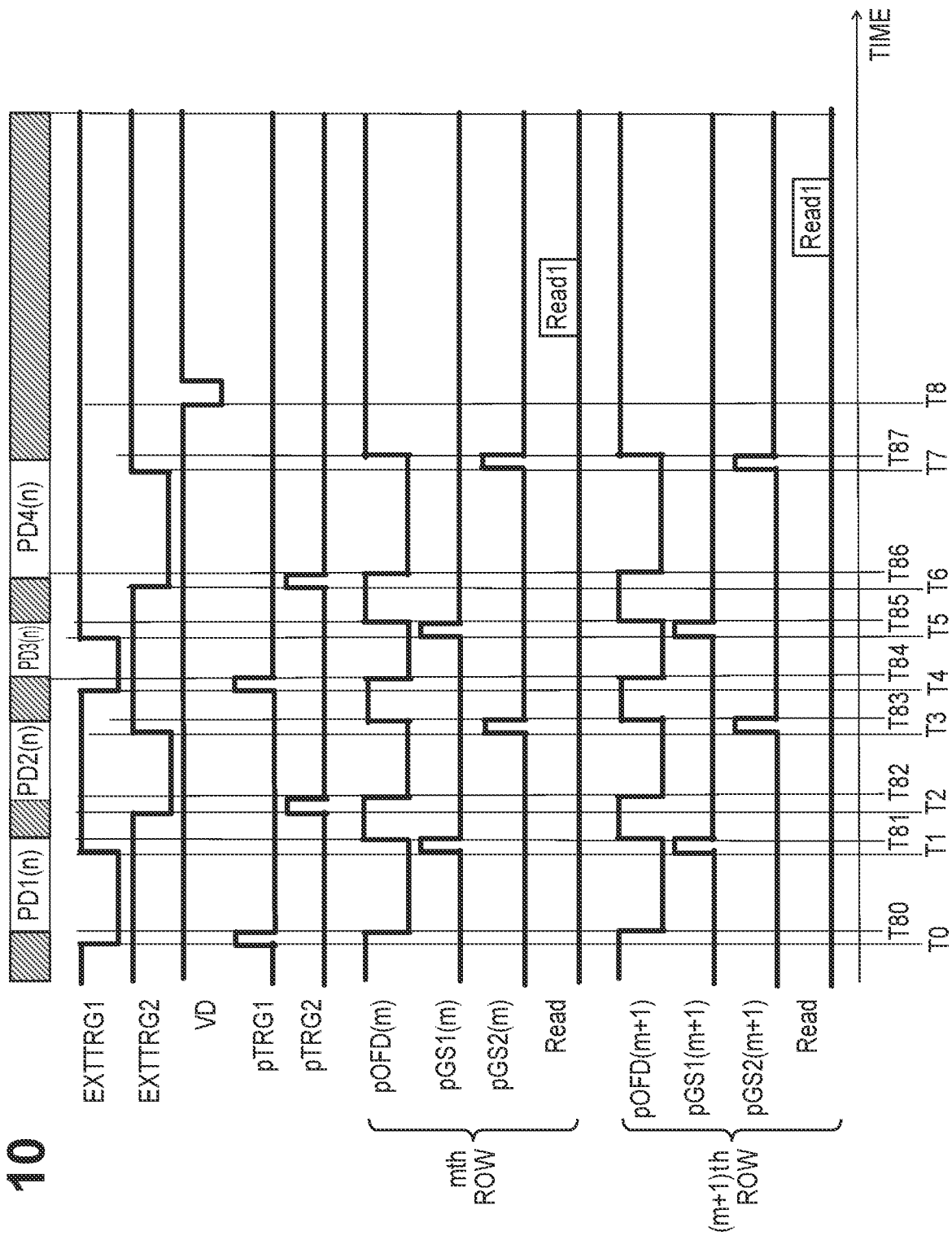
FIG. 10 is a timing chart showing the operation of the image sensing device according to the third embodiment.

An image sensing device according to the third embodiment of the present invention will be described with reference to FIGS. 8, 9, and 10. The third embodiment is a modification of the second embodiment, and matters that are not mentioned as the third embodiment can comply with the second embodiment. However, matters described in the third embodiment may be applied to the image sensing device ISD according to the first embodiment. FIG. 8 shows the schematic arrangement of an image sensing device ISD according to the third embodiment. As shown in FIG. 8, the image sensing device ISD according to the third embodiment additionally includes a synchronization signal terminal 108 configured to receive a vertical synchronization signal from an external device. In the third embodiment, signals from pixels 20 of a pixel array 100 are output in accordance with the vertical synchronization signal.

A driving method of the image sensing device ISD according to the third embodiment will be described with reference to FIG. 9. FIG. 9 conceptually shows the driving method of the image sensing device ISD according to the third embodiment. At time T0, a control circuit 105 detects the trailing edge of a first external trigger signal supplied to a first external trigger terminal 106, accordingly generates a first trigger pulse, and causes a photoelectric converter 1 to start accumulating charges with reference to the first trigger pulse. At time T1, the control circuit 105 detects the leading edge of the first external trigger signal supplied to the first external trigger terminal 106. According to the detection of the leading edge, the control circuit 105 causes the photoelectric converter 1 to transfer charges PD1($n$) accumulated in it during the period from time T0 to time T1 to a first charge holding portion 2 via a first transfer transistor 5 and causes the first charge holding portion 2 to hold the charges. This transfer is performed at once in all the pixels 20 of the pixel array 100. When the transfer ends at time T1, the control circuit 105 causes the photoelectric converter 1 to discharge the charges to a power supply line 13 via an overflow transistor 14.

At time T2, the control circuit 105 detects the trailing edge of a second external trigger signal supplied to a second external trigger terminal 107, accordingly generates a second trigger pulse, and causes the photoelectric converter 1 to start accumulating charges with reference to the second trigger pulse. At time T3, the control circuit 105 detects the leading edge of the second external trigger signal supplied to the second external trigger terminal 107. According to the detection of the leading edge, the control circuit 105 causes the photoelectric converter 1 to transfer charges PD2($n$) accumulated in it during the period from time T2 to time T3 to a second charge holding portion 3 via a second transfer transistor 6 and causes the second charge holding portion 3 to hold the charges. This transfer is performed at once in all the pixels 20 of the pixel array 100. In FIG. 9, when the transfer ends at time T3, the control circuit 105 causes the photoelectric converter 1 to discharge the charges to the power supply line 13 via the overflow transistor 14.

At time T4, the control circuit 105 detects the trailing edge of the first external trigger signal supplied to the first external trigger terminal 106, accordingly generates the first trigger pulse, and causes the photoelectric converter 1 to start accumulating charges with reference to the first trigger pulse. At time T5, the control circuit 105 detects the leading edge of the first external trigger signal supplied to the first external trigger terminal 106. According to the detection of the leading edge, the control circuit 105 causes the photoelectric converter 1 to transfer charges PD3($n$) accumulated in it during the period from time T4 to time T5 to the first charge holding portion 2 via the first transfer transistor 5 and causes the first charge holding portion 2 to hold the charges. This transfer is performed at once in all the pixels 20 of the pixel array 100. In the first charge holding portion 2, the already held charges PD1($n$) and the charges PD3($n$) newly transferred by the first transfer transistor 5 are added. When the transfer ends at time T5, the control circuit 105 causes the photoelectric converter 1 to discharge the charges to the power supply line 13 via the overflow transistor 14.

At time T6, the control circuit 105 detects the trailing edge of the second external trigger signal supplied to the second external trigger terminal 107, accordingly generates the second trigger pulse, and causes the photoelectric converter 1 to start accumulating charges with reference to the second trigger pulse. At time T7, the control circuit 105 detects the leading edge of the second external trigger signal supplied to the second external trigger terminal 107. According to the detection of the leading edge, the control circuit 105 causes the photoelectric converter 1 to transfer charges PD4($n$) accumulated in it during the period from time T6 to time T7 to the second charge holding portion 3 via the second transfer transistor 6 and causes the second charge holding portion 3 to hold the charges. This transfer is performed at once in all the pixels 20 of the pixel array 100. In the second charge holding portion 3, the already held charges PD2($n$) and the charges PD4($n$) newly transferred by the second transfer transistor 6 are added. When the transfer ends at time T7, the control circuit 105 causes the photoelectric converter 1 to discharge the charges to the power supply line 13 via the overflow transistor 14.

The control circuit 105 detects the trailing edge of the vertical synchronization signal at time T8, and accordingly causes the device to perform the read operation during the period from time T8 to time T9. In this read operation, charges MEM1($n$) held by the first charge holding portion 2 are row-sequentially read out from the first charge holding portion 2. The control circuit 105 detects the trailing edge of the vertical synchronization signal at time T10, and accordingly causes the device to perform the read operation during the period from time T10 to time T11. In this read operation, charges MEM2($n$) held by the second charge holding portion 3 are row-sequentially read out from the second charge holding portion 3. The read operation is performed by controlling a vertical scanning circuit 101, a column amplifier circuit 102, a horizontal scanning circuit 103, and an output circuit 104 by the control circuit 105.

The driving method of the image sensing device ISD according to the third embodiment will be described next in more detail with reference to FIG. 10. As shown in FIG. 10, at time T0, the control circuit 105 detects the trailing edge of a first external trigger signal EXTTRG1 supplied to the first external trigger terminal 106, and accordingly generates a first trigger pulse pTRG1. According to the first trigger pulse pTRG1, at time T80, the voltage of a discharge signal line pOFD transitions from high level to low level, and the overflow transistor 14 is turned off. Accordingly, the photoelectric converter 1 starts accumulating charges corresponding to incident light.

At time T1, the control circuit 105 detects the leading edge of the first external trigger signal EXTTRG1 supplied to the first external trigger terminal 106 and accordingly pulse-drives a first transfer signal line pGS1. The pulse-driven first transfer signal line pGS1 transitions from high level to low level at time T81. Accordingly, at time T81, the first transfer transistor 5 is turned off, and the charge transfer from the photoelectric converter 1 to the first charge holding portion 2 ends. The first charge accumulation period is the period from time T80 to time T81.

At time T2, the control circuit 105 detects the trailing edge of a second external trigger signal EXTTRG2 supplied to the second external trigger terminal 107, and accordingly generates a second trigger pulse pTRG2. According to the second trigger pulse pTRG2, at time T82, the voltage of the discharge signal line pOFD transitions from high level to low level, and the overflow transistor 14 is turned off. Accordingly, the photoelectric converter 1 starts accumulating charges corresponding to incident light.

At time T3, the control circuit 105 detects the leading edge of the second external trigger signal EXTTRG2 supplied to the second external trigger terminal 107 and accordingly pulse-drives a second transfer signal line pGS2. The pulse-driven second transfer signal line pGS2 transitions from high level to low level at time T83. Accordingly, at time T83, the first transfer transistor 5 is turned off, and the charge transfer from the photoelectric converter 1 to the second charge holding portion 3 ends. The second charge accumulation period is the period from time T82 to time T83.

At time T4, the control circuit 105 detects the trailing edge of the first external trigger signal EXTTRG1 supplied to the first external trigger terminal 106, and accordingly generates the first trigger pulse pTRG1. According to the first trigger pulse pTRG1, at time T84, the voltage of the discharge signal line pOFD transitions from high level to low level, and the overflow transistor 14 is turned off. Accordingly, the photoelectric converter 1 starts accumulating charges corresponding to incident light.

At time T5, the control circuit 105 detects the leading edge of the first external trigger signal EXTTRG1 supplied to the first external trigger terminal 106 and accordingly pulse-drives the first transfer signal line pGS1. The pulse-driven first transfer signal line pGS1 transitions from high level to low level at time T85. Accordingly, at time T85, the first transfer transistor 5 is turned off, and the charge transfer from the photoelectric converter 1 to the first charge holding portion 2 ends. The third charge accumulation period is the period from time T84 to time T85.

At time T6, the control circuit 105 detects the trailing edge of the second external trigger signal EXTTRG2 supplied to the second external trigger terminal 107, and accordingly generates the second trigger pulse pTRG2. According to the second trigger pulse pTRG2, at time T86, the voltage of the discharge signal line pOFD transitions from high level to low level, and the overflow transistor 14 is turned off. Accordingly, the photoelectric converter 1 starts accumulating charges corresponding to incident light.

At time T7, the control circuit 105 detects the leading edge of the second external trigger signal EXTTRG2 supplied to the second external trigger terminal 107 and accordingly pulse-drives the second transfer signal line pGS2. The pulse-driven second transfer signal line pGS2 transitions from high level to low level at time T87. Accordingly, at time T87, the first transfer transistor 5 is turned off, and the charge transfer from the photoelectric converter 1 to the second charge holding portion 3 ends. The fourth charge accumulation period is the period from time T86 to time T87.

The control circuit 105 detects the trailing edge of the vertical synchronization signal at time T8, and accordingly controls the read operation such that the charges MEM1($n$) held by the first charge holding portion 2 are row-sequentially read out from the first charge holding portion 2.

According to the third embodiment, even in a case in which the external trigger signals are given at a time interval shorter than that of the read operation of one frame (the period of the vertical synchronization signal) defined by the vertical synchronization signal, image sensing according to this can be performed. In addition, when the timing of charge accumulation when performing the charge transfer from the photoelectric converter 1 to the first charge holding portion 2 or the second charge holding portion 3 a plurality of times is controlled by the external trigger signals, the degree of freedom in control of multiple exposure can be increased. Furthermore, as for the timing of charge transfer to the charge holding portion, the charge transfer is alternately performed for the first charge holding portion, the second charge holding portion, the first charge holding portion, . . . . This can reduce the influence of overlap of an object, which is caused by multiple exposure. In addition, when the start of the read operation is controlled by the signal (vertical synchronization signal) from the external device, the degree of freedom of the timing of the read operation can be improved.

Figure 11:
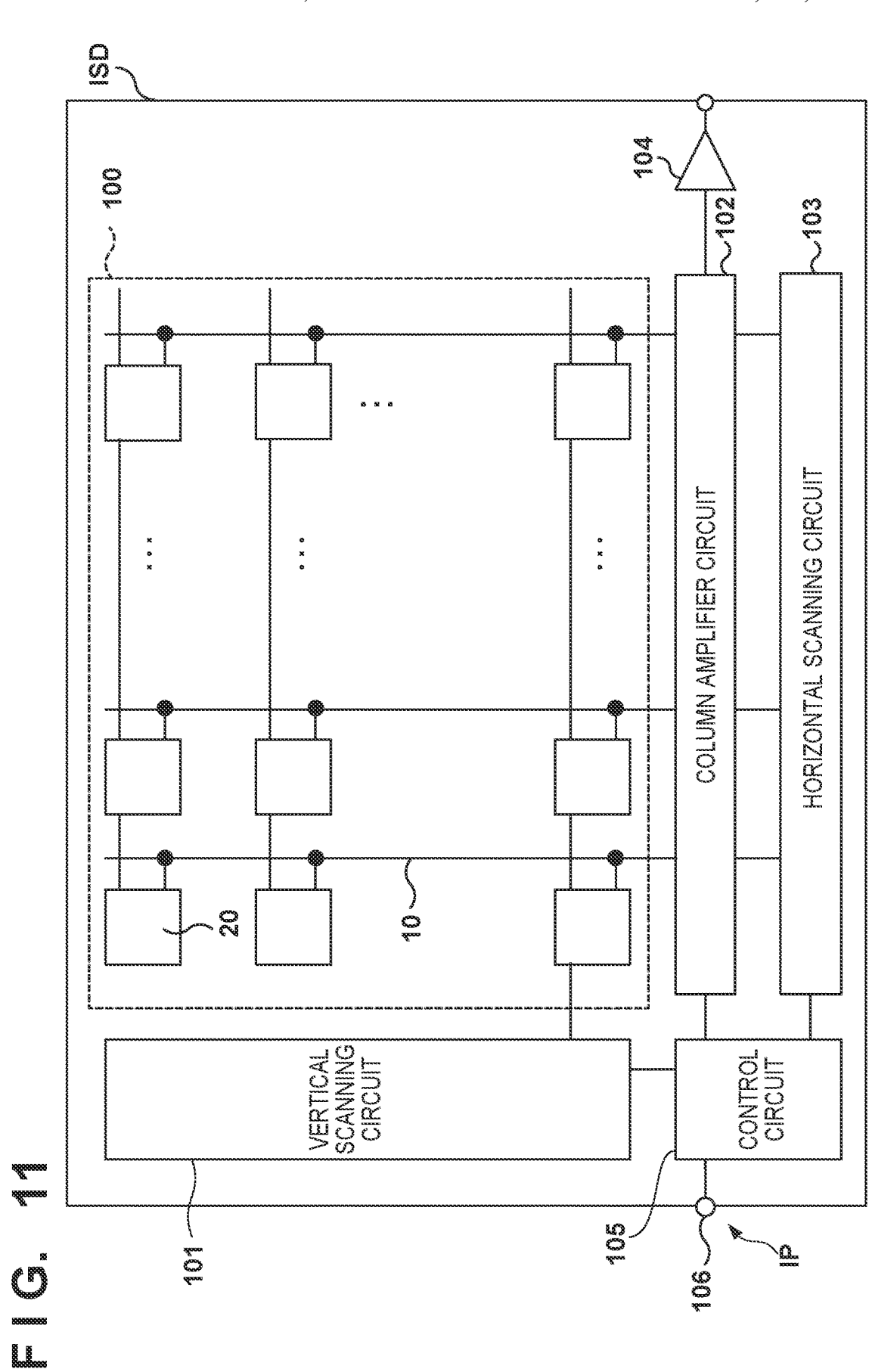
FIG. 11 is a block diagram showing the schematic arrangement of an image sensing device according to the fourth embodiment.

An image sensing device according to the fourth embodiment of the present invention will be described with reference to FIGS. 11, 12, 13, and 14. The fourth embodiment is a modification of the second embodiment, and matters that are not mentioned as the fourth embodiment can comply with the second embodiment. However, matters described in the fourth embodiment may be applied to the image sensing device ISD according to the first or third embodiment. FIG. 11 shows the schematic arrangement of an image sensing device ISD according to the fourth embodiment. As shown in FIG. 11, in the image sensing device ISD according to the fourth embodiment, the two external trigger terminals are multiplexed into one external trigger terminal.

Figure 12:
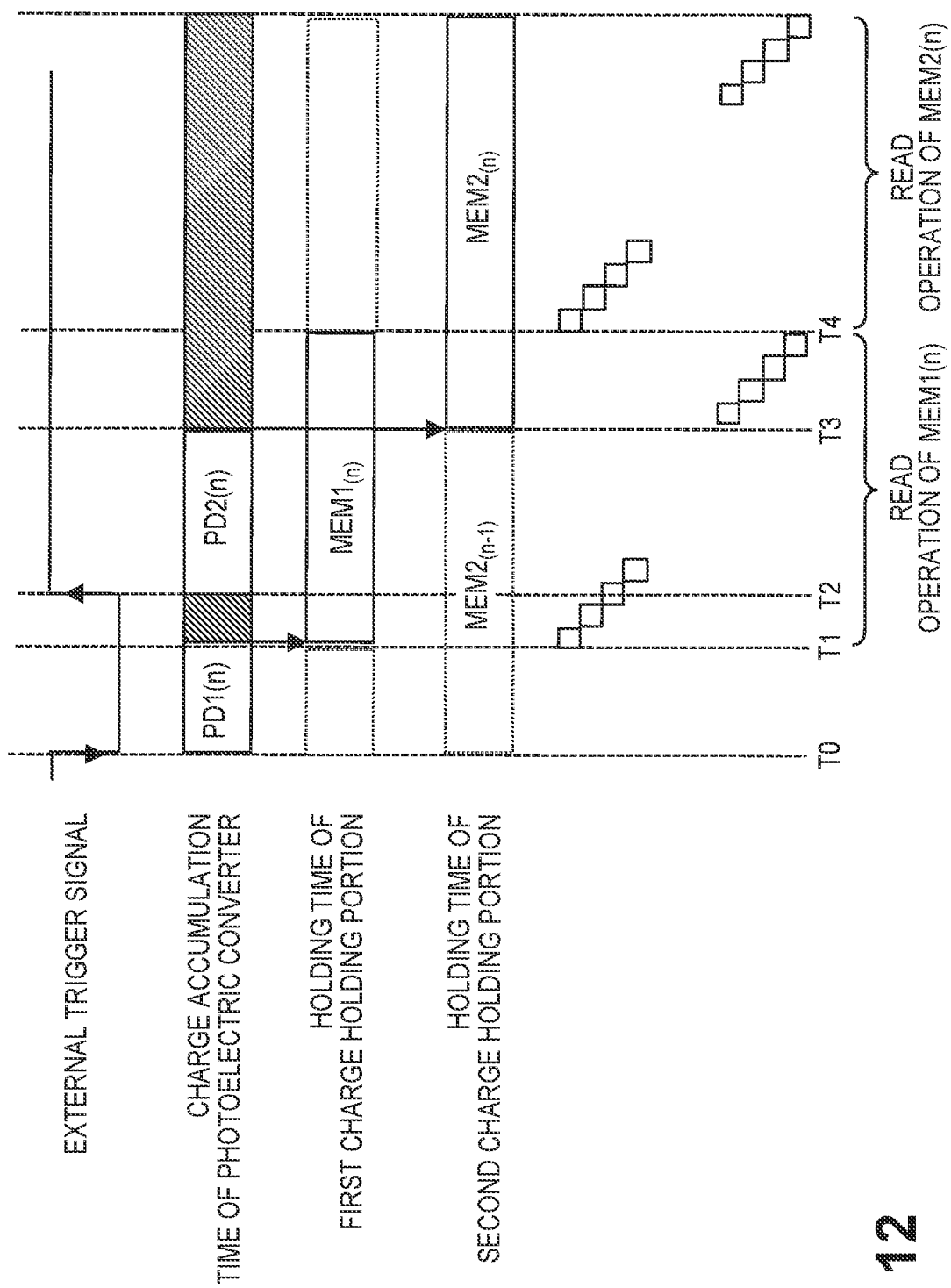
FIG. 12 is a timing chart conceptually showing the operation of the image sensing device according to the fourth embodiment.

A driving method of the image sensing device ISD according to the fourth embodiment will be described next with reference to FIG. 12. FIG. 12 conceptually shows the driving method of the image sensing device ISD according to the fourth embodiment. Referring to FIG. 12, the arrow from the photoelectric converter to the first charge holding portion means transfer of charges in a global electronic shutter operation. In FIG. 12, operations concerning the nth frame are indicated by solid lines, and operations concerning the (n+1)th frame and the (n−1)th frame are indicated by broken lines.

At time T0, a control circuit 105 detects the trailing edge of an external trigger signal supplied to an external trigger terminal 106, accordingly generates a first trigger pulse, and causes a photoelectric converter 1 to start accumulating charges with reference to the first trigger pulse. At time T1, the control circuit 105 causes the photoelectric converter 1 to transfer charges PD1($n$) accumulated in it during the period from time T0 to time T1 to a first charge holding portion 2 via a first transfer transistor 5 and causes the first charge holding portion 2 to hold the charges. This transfer is performed at once in all pixels 20 of a pixel array 100. In FIG. 12, the charges held by the first charge holding portion 2 are represented by MEM1($n$). When the transfer ends at time T1, the control circuit 105 causes the photoelectric converter 1 to discharge the charges to a power supply line 13 via an overflow transistor 14.

The control circuit 105 controls the read operation such that a signal corresponding to the charges MEM1($n$) whose accumulation is started in accordance with the first trigger pulse is row-sequentially read out from the first charge holding portion 2 during the period from the transfer end time of time T1 to time T4. At time T2, the control circuit 105 detects the leading edge of the external trigger signal (pulse signal) supplied to the external trigger terminal 106, accordingly generates a second trigger pulse, and causes the photoelectric converter 1 to start accumulating charges with reference to the second trigger pulse. At time T3, the control circuit 105 causes the photoelectric converter 1 to transfer charges PD2($n$) accumulated in it during the period from time T2 to time T3 to a second charge holding portion 3 via a second transfer transistor 6 and causes the second charge holding portion 3 to hold the charges. This transfer is performed at once in all the pixels 20 of the pixel array 100. In FIG. 12, the charges held by the second charge holding portion 3 are represented by MEM2($n$).

At time T4, the read operation of the signal corresponding to the charges MEM1($n$) held by the first charge holding portion 2 ends, and the read operation of the signal corresponding to the charges MEM2($n$) held by the second charge holding portion 3 starts next.

Figure 13:
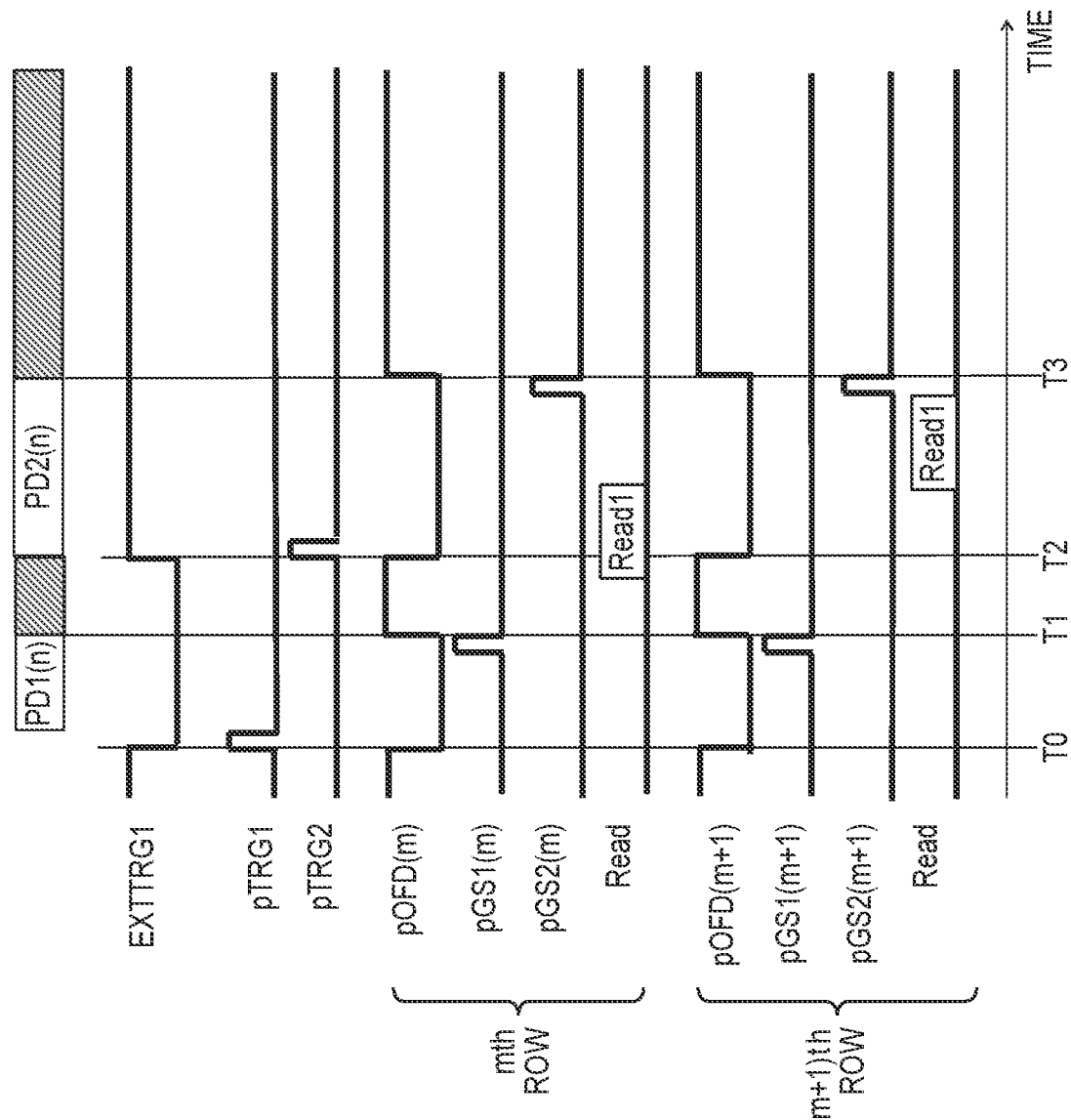
FIG. 13 is a timing chart showing an operation of the image sensing device according to the fourth embodiment.

The driving method of the image sensing device ISD according to the fourth embodiment will be described next in more detail with reference to FIG. 13. As shown in FIG. 13, at time T0, the control circuit 105 detects the trailing edge of an external trigger signal EXTTRG1 supplied to the external trigger terminal 106, and accordingly generates a first trigger pulse pTRG1. According to the leading edge of the first trigger pulse pTRG1, the voltage of a discharge signal line pOFD transitions from high level to low level, and an overflow transistor 14 is turned off. Accordingly, the photoelectric converter 1 starts accumulating charges corresponding to incident light. Based on a charge accumulation time defined by a parameter value set in the register (not shown) of the image sensing device ISD, the control circuit 105 controls pulse driving of the first transfer signal line pGS1 such that the voltage of a first transfer signal line pGS1 transitions from high level to low level at time T1. Accordingly, at time T1, the first transfer transistor 5 is turned off, and the charge transfer from the photoelectric converter 1 to the first charge holding portion 2 ends.

The control circuit 105 controls the read operation such that a signal corresponding to the charges MEM1($n$) whose accumulation is started in accordance with the first trigger pulse is row-sequentially read out from the first charge holding portion 2 during the period from the transfer end time of time T1 to time T4.

At time T2, the control circuit 105 detects the leading edge of the external trigger signal EXTTRG1 supplied to the external trigger terminal 106, and accordingly generates a second trigger pulse pTRG2. According to the leading edge of the second trigger pulse pTRG2, the voltage of the discharge signal line pOFD transitions from high level to low level, and the overflow transistor 14 is turned off. Accordingly, the photoelectric converter 1 starts accumulating charges corresponding to incident light. Based on a charge accumulation time defined by a parameter value set in the register (not shown) of the image sensing device ISD, the control circuit 105 controls pulse driving of the second transfer signal line pGS2 such that the voltage of a second transfer signal line pGS2 transitions from high level to low level at time T3. Accordingly, at time T3, the second transfer transistor 6 is turned off, and the charge transfer from the photoelectric converter 1 to the second charge holding portion 3 ends.

At time T4, the read operation of the signal corresponding to the charges MEM1($n$) held by the first charge holding portion 2 ends, and the read operation of the signal corresponding to the charges MEM2($n$) held by the second charge holding portion 3 starts next.

In the above-described example, the control circuit 105 generates the first trigger pulse using the trailing edge of the external trigger signal supplied to the external trigger terminal 106 as the first timing, and generates the second trigger pulse using the leading edge of the external trigger signal as the second timing. However, the control circuit 105 generates the first trigger pulse using the leading edge of the external trigger signal supplied to the external trigger terminal 106 as the first timing, and generates the second trigger pulse using the trailing edge of the external trigger signal as the second timing. That is, the external trigger signal supplied to the external trigger terminal 106 gives the first timing at one of the leading edge and the trailing edge and gives the second timing at the other of the leading edge and the trailing edge.

Figure 14:
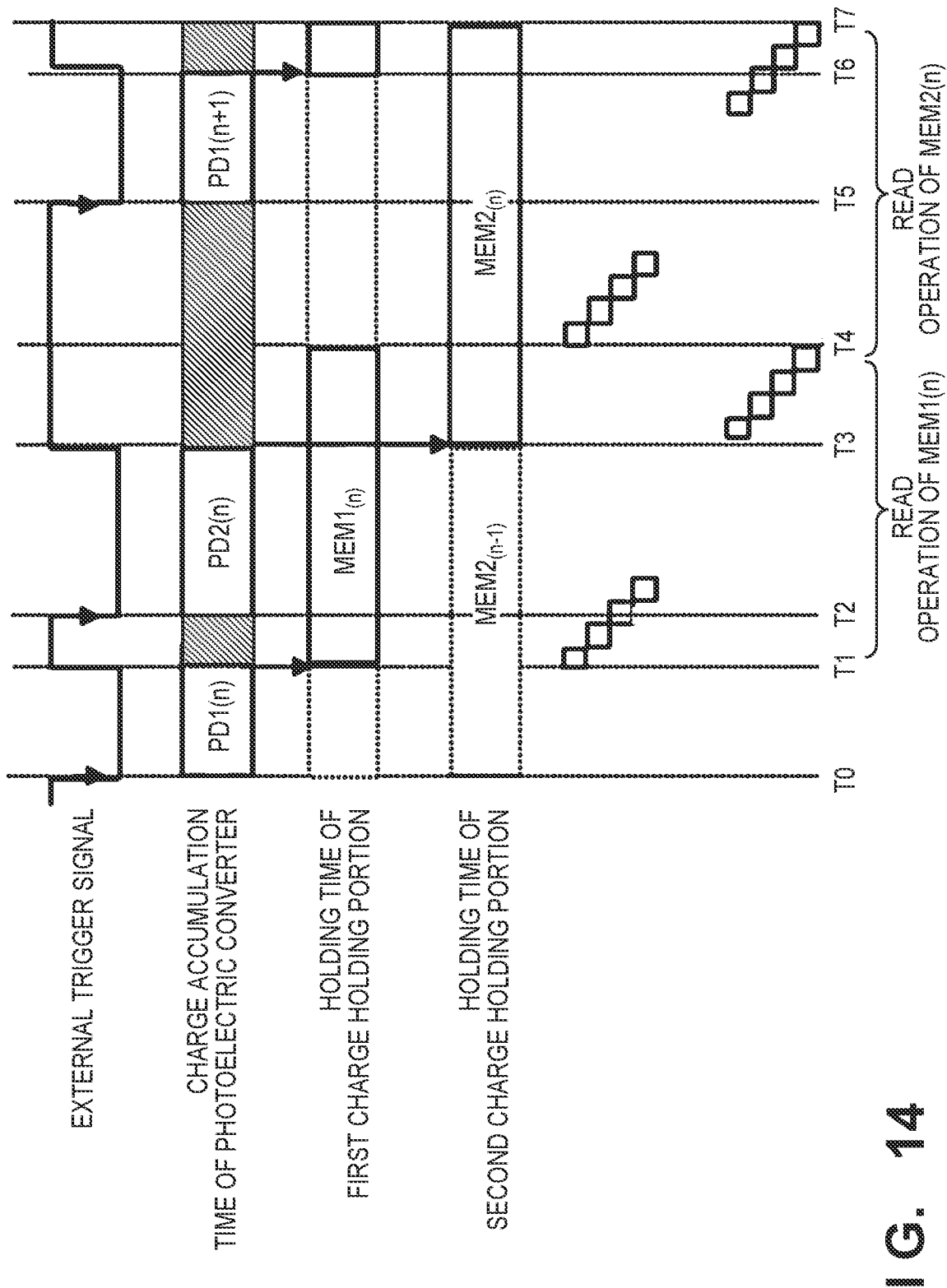
FIG. 14 is a timing chart showing another operation of the image sensing device according to the fourth embodiment.

In addition, FIG. 14 conceptually shows the driving method of the image sensing device ISD that is another modification of the fourth embodiment. Referring to FIG. 14, the arrow from the photoelectric converter to the first charge holding portion means transfer of charges in a global electronic shutter operation. In FIG. 14, operations concerning the nth frame are indicated by solid lines, and operations concerning the (n+1)th frame and the (n−1)th frame are indicated by broken lines.

At time T0, the control circuit 105 detects the trailing edge of the external trigger signal supplied to the external trigger terminal 106, and generates the first trigger pulse in accordance with the trailing edge and a trigger identification signal (not shown) in the image sensing device. Then, the control circuit 105 causes the photoelectric converter 1 to start accumulating charges with reference to the first trigger pulse. At time T1, the control circuit 105 causes the photoelectric converter 1 to transfer charges PD1($n$) accumulated in it during the period from time T0 to time T1 to the first charge holding portion 2 via the first transfer transistor 5 and causes the first charge holding portion 2 to hold the charges. This transfer is performed at once in all the pixels 20 of the pixel array 100. In FIG. 14, the charges held by the first charge holding portion 2 are represented by MEM1($n$). At time T1, the control circuit 105 detects the leading edge of the external trigger signal supplied to the external trigger terminal 106. According to the detection of the leading edge, the control circuit 105 causes the photoelectric converter 1 to transfer the charges PD1($n$) accumulated in it during the period from time T0 to time T1 to the first charge holding portion 2 via the first transfer transistor 5 and causes the first charge holding portion 2 to hold the charges. This transfer is performed at once in all the pixels 20 of the pixel array 100. When the transfer ends at time T1, the control circuit 105 causes the photoelectric converter 1 to discharge the charges to the power supply line 13 via the overflow transistor 14. In addition, at time T1, the trigger identification signal in the image sensing device is inverted to generate the second trigger pulse at the next trailing edge.

The control circuit 105 controls the read operation such that the charges MEM1($n$) whose accumulation is started in accordance with the first trigger pulse are row-sequentially read out from the first charge holding portion 2 during the period from the transfer end time of time T1 to time T4. The read operation is performed by controlling a vertical scanning circuit 101, a column amplifier circuit 102, a horizontal scanning circuit 103, and an output circuit 104 by the control circuit 105.

At time T2, the control circuit 105 detects the trailing edge of the external trigger signal supplied to the external trigger terminal 106, and generates the second trigger pulse in accordance with the trailing edge and the trigger identification signal in the image sensing device. Then, the control circuit 105 causes the photoelectric converter 1 to start accumulating charges with reference to the second trigger pulse. At time T3, the control circuit 105 detects the leading edge of the external trigger signal supplied to the external trigger terminal 106. According to the detection of the leading edge, the control circuit 105 causes the photoelectric converter 1 to transfer the charges PD2($n$) accumulated in it during the period from time T2 to time T3 to the second charge holding portion 3 via the second transfer transistor 6 and causes the second charge holding portion 3 to hold the charges. This transfer is performed at once in all the pixels 20 of the pixel array 100. In FIG. 14, when the transfer ends at time T3, the control circuit 105 causes the photoelectric converter 1 to discharge the charges to the power supply line 13 via the overflow transistor 14. In addition, at time T1, the trigger identification signal in the image sensing device is inverted to generate the first trigger pulse at the next trailing edge.

At time T4, the read operation of the signal corresponding to the charges MEM1($n$) ends, and the read operation of the signal corresponding to the charges MEM2($n$) starts next. During the period from time T4 to time T7, the read operation of the signal corresponding to the charges MEM2($n$) is performed.

At time T5, the control circuit 105 detects the trailing edge of the external trigger signal supplied to the external trigger terminal 106, and generates the first trigger pulse in accordance with the trailing edge and the trigger identification signal in the image sensing device. Then, the control circuit 105 causes the photoelectric converter 1 to start accumulating charges with reference to the first trigger pulse. At time T6, the control circuit 105 detects the leading edge of the external trigger signal supplied to the external trigger terminal 106. According to the detection of the leading edge, the control circuit 105 causes the photoelectric converter 1 to transfer the charges PD1($n$+1) accumulated in it during the period from time T5 to time T6 to the first charge holding portion 2 via the first transfer transistor 5 and causes the first charge holding portion 2 to hold the charges. This transfer is performed at once in all the pixels 20 of the pixel array 100. When the transfer ends at time T5, the control circuit 105 causes the photoelectric converter 1 to discharge the charges to the power supply line 13 via the overflow transistor 14.

According to the fourth embodiment, it is possible to decrease the number of external trigger terminals. In addition, an effect of avoiding the influence of signal delay on two signal lines corresponding to two external trigger terminals, unlike other embodiments, is provided.

Figure 15:
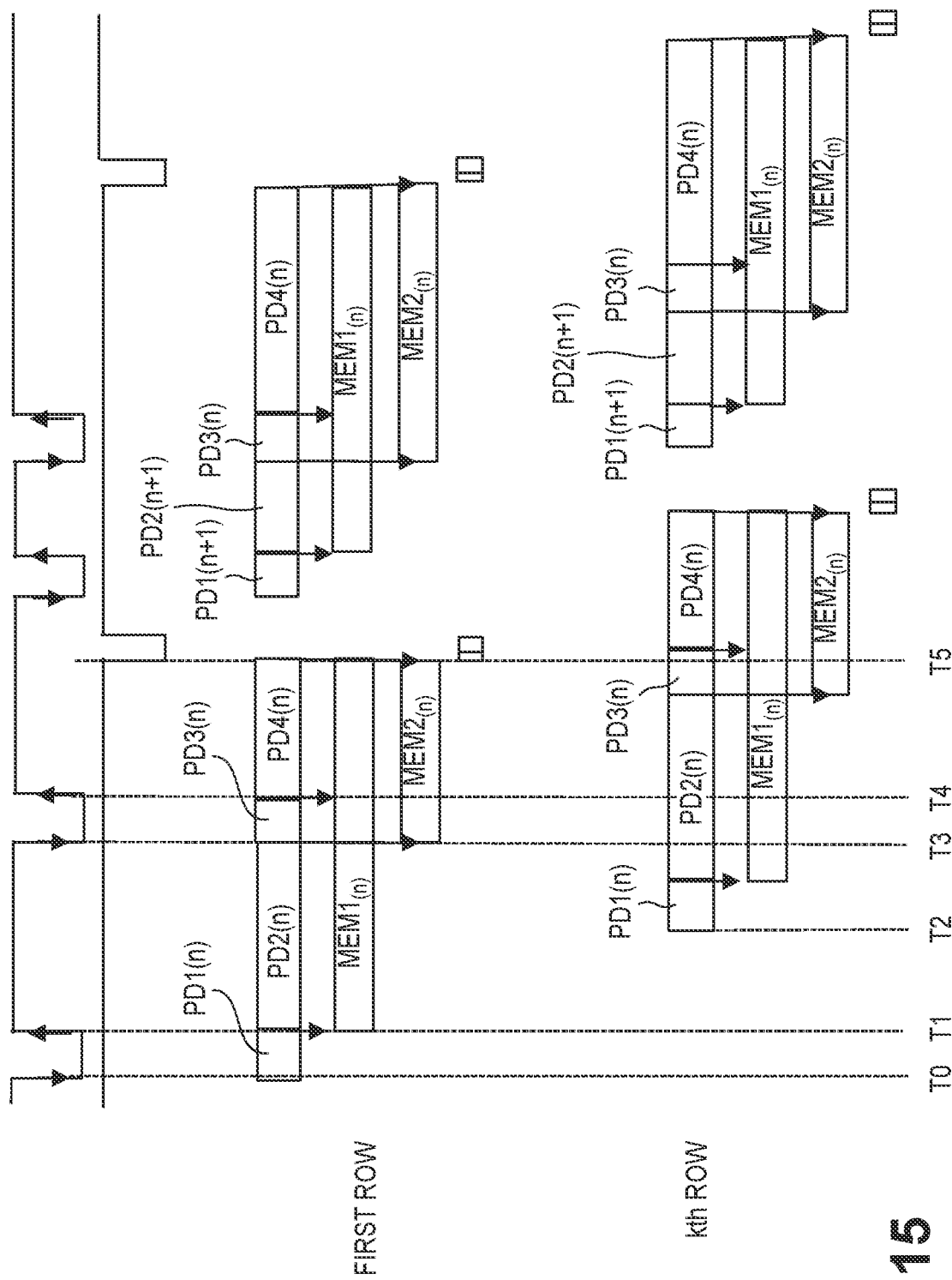
FIG. 15 is a timing chart conceptually showing the operation of an image sensing device according to the fifth embodiment.
Figure 16A:
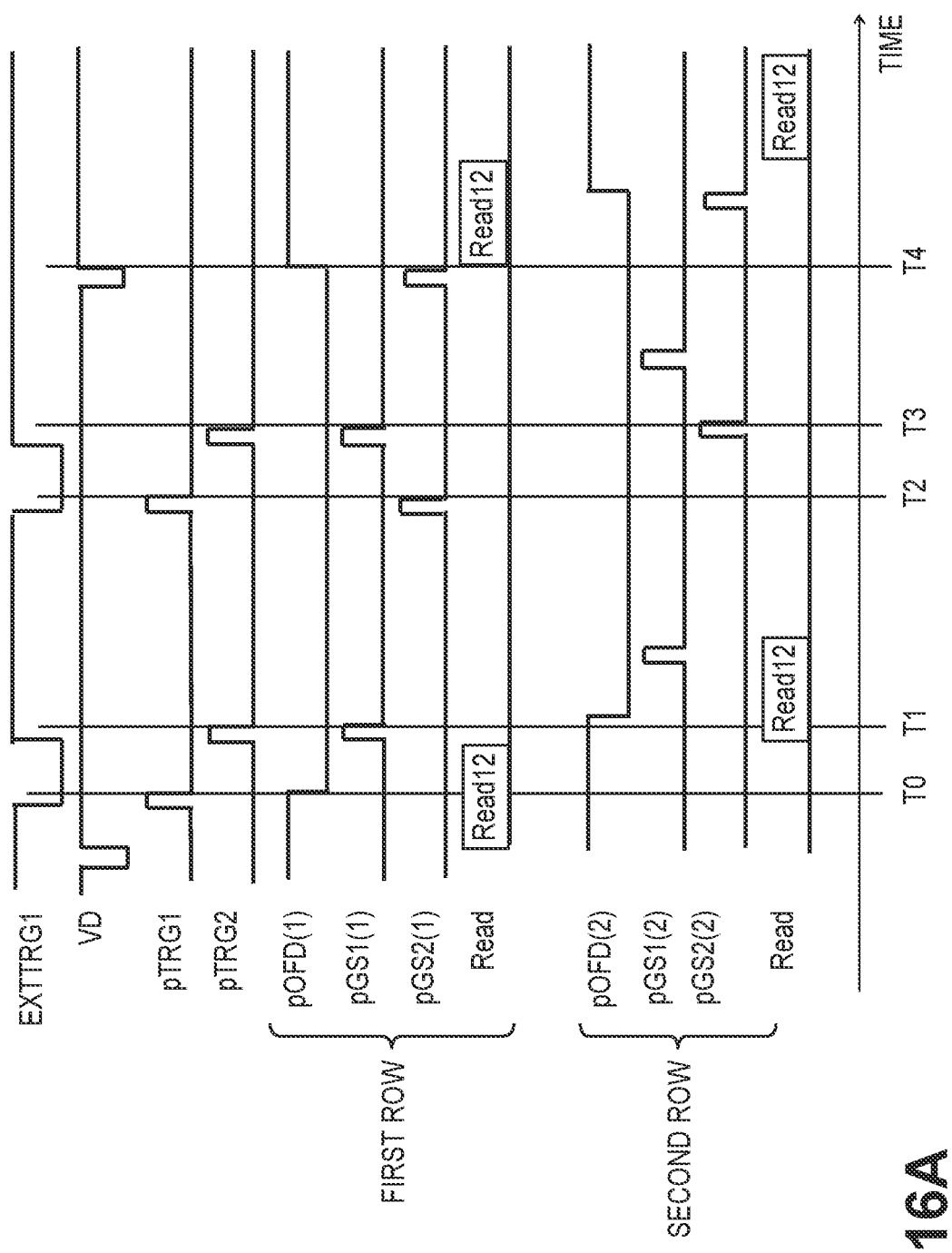
FIGS. 16A and 16B are timing charts showing the operation of the image sensing device according to the fifth embodiment.

An image sensing device according to the fifth embodiment of the present invention will be described with reference to FIGS. 15, 16A, and 16B. The fifth embodiment is a modification of the fourth embodiment, and matters that are not mentioned as the fifth embodiment can comply with the fourth embodiment. However, matters described in the fifth embodiment may be applied to the image sensing devices 1 according to the first to third embodiments. An image sensing device ISD according to the fifth embodiment is different from the image sensing device ISD according to the fourth embodiment in that the electronic shutter operation is a rolling shutter operation, and multiple exposure is performed.

At time T0, a control circuit 105 detects the trailing edge of an external trigger signal supplied to an external trigger terminal 106, accordingly generates a first trigger pulse, and causes a photoelectric converter 1 of each pixel 20 of the first row to start accumulating charges with reference to the first trigger pulse. From then on, the control circuit 105 row-sequentially causes the photoelectric converter 1 of each pixel 20 of the second and subsequent rows to start accumulating charges. Here, the accumulation of charges in the photoelectric converter 1 is started by turning off an overflow transistor 14.

At time T1, the control circuit 105 detects the leading edge of the external trigger signal supplied to the external trigger terminal 106, and accordingly generates a second trigger pulse. Then, according to the second trigger pulse, the control circuit 105 causes the photoelectric converter 1 of each pixel 20 of the first row to transfer signal charges PD1($n$) accumulated in it during the period from time T0 to time T1 to a first charge holding portion 2 via a first transfer transistor 5 and causes the first charge holding portion 2 to hold the charges. After that, the charges are row-sequentially transferred to the first charge holding portion 2. In FIG. 15, the charges held by the first charge holding portion 2 are represented by MEM1($n$). When the charge transfer from the photoelectric converter 1 to the first charge holding portion 2 in each pixel 20 of the first row ends, that is, when charge accumulation during the first charge accumulation period ends at time T1, charge accumulation in the second charge accumulation period starts.

At time T2, the control circuit 105 detects the trailing edge of the external trigger signal supplied to the external trigger terminal 106, and accordingly generates the first trigger pulse. Then, according to the first trigger pulse, the control circuit 105 causes the photoelectric converter 1 to transfer charges PD2($n$) accumulated in it during the period from time T1 to time T3 to a second charge holding portion 3. When the transfer ends, charge accumulation in the third charge accumulation period starts.

At time T3, the control circuit 105 detects the leading edge of the external trigger signal supplied to the external trigger terminal 106, and accordingly generates the second trigger pulse. Then, according to the second trigger pulse, the control circuit 105 causes the photoelectric converter 1 of each pixel 20 of the first row to transfer signal charges PD3($n$) accumulated in it during the period from time T3 to time T4 to the first charge holding portion 2 via the first transfer transistor 5 and causes the first charge holding portion 2 to hold the charges. After that, the charges are row-sequentially transferred to the first charge holding portion 2. When the transfer ends, charge accumulation in the fourth charge accumulation period starts.

At time T4, the control circuit 105 detects the trailing edge of a vertical synchronization signal, and accordingly starts the read operation of a signal from each pixel 20 of the first row and row-sequentially performs the read operation.

The driving method of the image sensing device ISD according to the fifth embodiment will be described next in more detail with reference to FIGS. 16A and 16B. As shown in FIG. 16A, at time T0, the control circuit 105 detects the trailing edge of an external trigger signal EXTTRG1 supplied to the external trigger terminal 106, and accordingly generates a first trigger pulse pTRG1. According to the first trigger pulse pTRG1, the voltage of a discharge signal line pOFD(1) for the pixels 20 of the first row transitions from high level to low level, and the overflow transistor 14 of each pixel 20 of the first row is turned off. Accordingly, the photoelectric converter 1 of each pixel 20 of the first row starts accumulating charges corresponding to incident light.

At time T1, the control circuit 105 detects the leading edge of the external trigger signal EXTTRG1 supplied to the external trigger terminal 106, and accordingly generates a second trigger pulse pTRG2. According to the second trigger pulse pTRG2, the control circuit 105 generates a pulse in a first transfer signal pGS1(1) for the pixels 20 of the first row. Accordingly, when the first transfer signal pGS1(1) is at high level, the charges are transferred from the photoelectric converter 1 to the first charge holding portion 2 in each pixel 20 of the first row.

At time T2, the control circuit 105 detects the trailing edge of the external trigger signal EXTTRG1 supplied to the external trigger terminal 106, and accordingly generates the first trigger pulse pTRG1. According to the first trigger pulse pTRG1, the control circuit 105 generates a pulse in a second transfer signal pGS2(1) for the pixels 20 of the first row. Accordingly, when the second transfer signal pGS2(1) is at high level, the charges are transferred from the photoelectric converter 1 to the second charge holding portion 3 in each pixel 20 of the first row.

At time T3, the control circuit 105 detects the leading edge of the external trigger signal EXTTRG1 supplied to the external trigger terminal 106, and accordingly generates the second trigger pulse pTRG2. According to the second trigger pulse pTRG2, the control circuit 105 generates a pulse in the first transfer signal pGS1(1) for the pixels 20 of the first row. Accordingly, when the first transfer signal pGS1(1) is at high level, the charges are transferred from the photoelectric converter 1 to the first charge holding portion 2 in each pixel 20 of the first row.

At time T4, the control circuit 105 detects the trailing edge of the vertical synchronization signal, and accordingly starts the read operation of the signal from each pixel 20 of the first row and row-sequentially performs the read operation. This operation is shown in FIG. 16B.

Figure 16B:
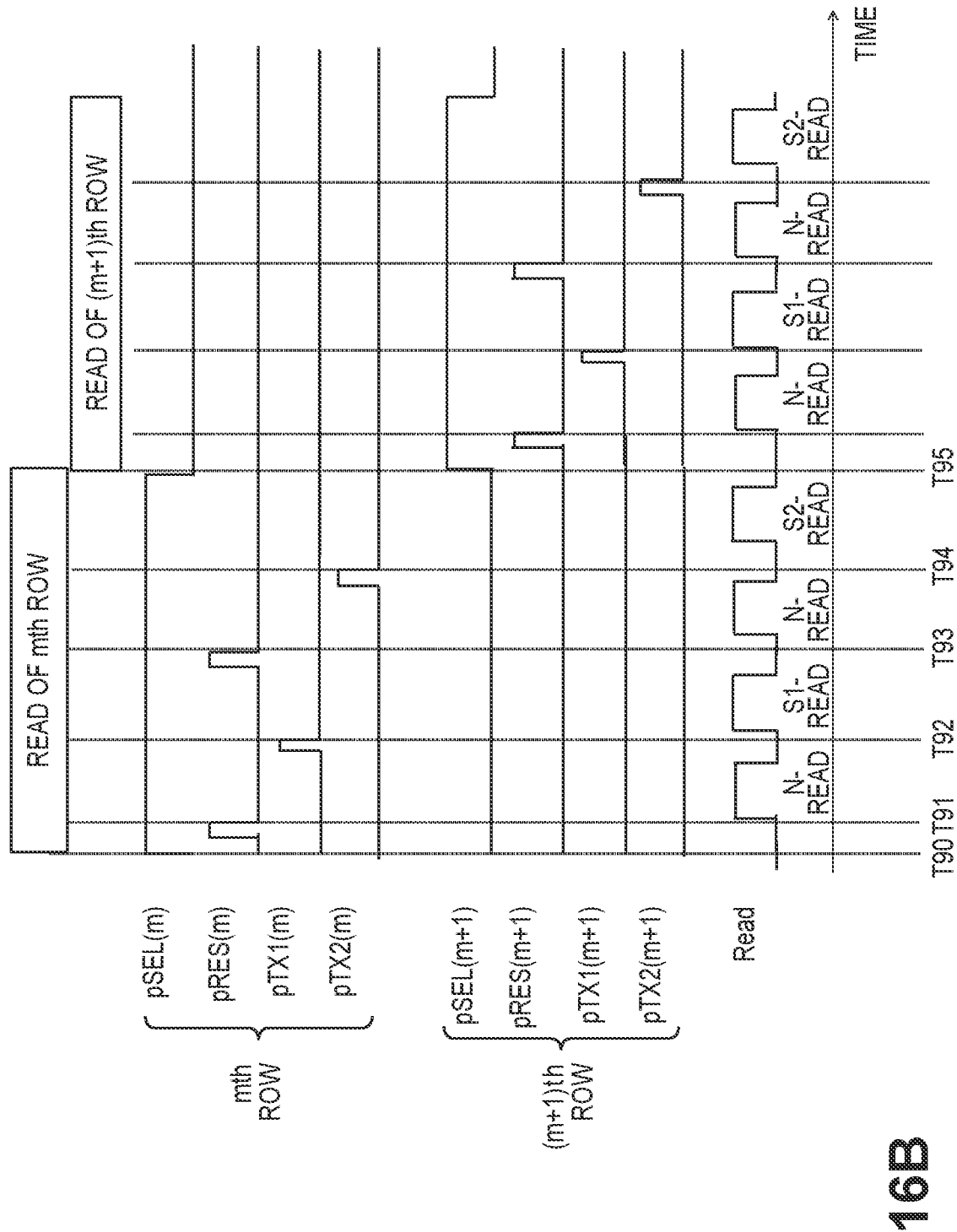

FIG. 16B shows the read operation (Read in FIG. 16A) from the first charge holding portions 2 of the pixels 20 of the mth row and the (m+1)th row. At time T90, the control circuit 105 makes the voltage of a selection signal line pSEL(m) transition from low level to high level via a vertical scanning circuit 101. The pixels 20 of the mth row are thus selected. Halfway through the period from time T90 to time T91, the control circuit 105 makes the voltage of a reset signal line pRES(m) transition to high level and turns on a reset transistor 11 by the control via the vertical scanning circuit 101. At time T91, the control circuit 105 makes the voltage of the reset signal line pRES(m) transition to low level and turns off the reset transistor 11 by the control via the vertical scanning circuit 101. With this operation, the charges existing in a floating diffusion 4 are discharged to a power supply line 13. The voltage (noise) signal of the floating diffusion 4 is amplified by the source follower operation and output to a vertical output line 10.

During the period from time T91 to time T92, the control circuit 105 causes a column amplifier circuit 102 to read out the noise signal (N-read). After that, the control circuit 105 makes the voltage of a third transfer signal line pTX1(m) transition to high level and turns on a third transfer transistor 7 by control via the vertical scanning circuit 101. The charges MEM1(m) (the charges accumulated in accordance with the first trigger pulse) are thus transferred from the first charge holding portion 2 that holds the charges of the pixels 20 of the mth row to the floating diffusion 4. The voltage (optical signal) of the floating diffusion 4 is amplified by the source follower operation and output to the vertical output line 10. At time T92, the control circuit 105 turns off the voltage of the third transfer signal line pTX1(m) by control via the vertical scanning circuit 101.

During the period from time T92 to time T93, the control circuit 105 causes the column amplifier circuit 102 to read out the optical signal corresponding to the charges MEM1(m) (S1-read), and after that, makes the voltage of the reset signal line pRES(m) transition to high level by the control via the vertical scanning circuit 101. The reset transistor 11 is thus turned on. At time T93, the control circuit 105 makes the voltage of the reset signal line pRES(m) transition to low level and turns off the reset transistor 11 by the control via the vertical scanning circuit 101. With this operation, the charges existing in the floating diffusion 4 are discharged to the power supply line 13. The voltage (noise) signal of the floating diffusion 4 is amplified by the source follower operation and output to the vertical output line 10.

During the period from time T94 to time T95, the control circuit 105 causes the column amplifier circuit 102 to read out the noise signal (N-read). After that, the control circuit 105 makes the voltage of a fourth transfer signal line pTX2(m) transition to high level and turns on a fourth transfer transistor 8 by control via the vertical scanning circuit 101. The charges MEM2(m) (the charges accumulated in accordance with the first trigger pulse) are thus transferred from the second charge holding portion 3 that holds the charges of the pixels 20 of the mth row to the floating diffusion 4. The voltage (optical signal) of the floating diffusion 4 is amplified by the source follower operation and output to the vertical output line 10. At time T94, the control circuit 105 turns off the voltage of the fourth transfer signal line pTX2(m) by control via the vertical scanning circuit 101.

During the period from time T94 to time T95, the control circuit 105 causes the column amplifier circuit 102 to read out the optical signal corresponding to the charges MEM2(m) (S2-read). After that, the control circuit 105 makes the voltage of the reset signal line pRES(m) transition to high level by control via the vertical scanning circuit 101. The reset transistor 11 is thus turned on.

At time T95, the control circuit 105 makes the voltage of the selection signal line pSEL(m) transition to low level by control via the vertical scanning circuit 101, thereby ending selection of the mth row. In addition, the control circuit 105 makes the voltage of the selection signal line pSEL(m+1) transition to high level, thereby starting selection of the (m+1)th row.

According to the fifth embodiment, in a state in which an object continuously moves asynchronously with the vertical synchronization signal, even if the image sensing interval is shorter than a time interval shorter than that of the read operation of one frame (the period of the vertical synchronization signal) defined by the vertical synchronization signal, continuous image sensing can be performed. In addition, an image for which the charge accumulation time is short and an image for which the charge accumulation time is long can be obtained. Furthermore, an object such as a moving apparatus can be recorded in one image a plurality of times by multiple exposure.

Figure 17:
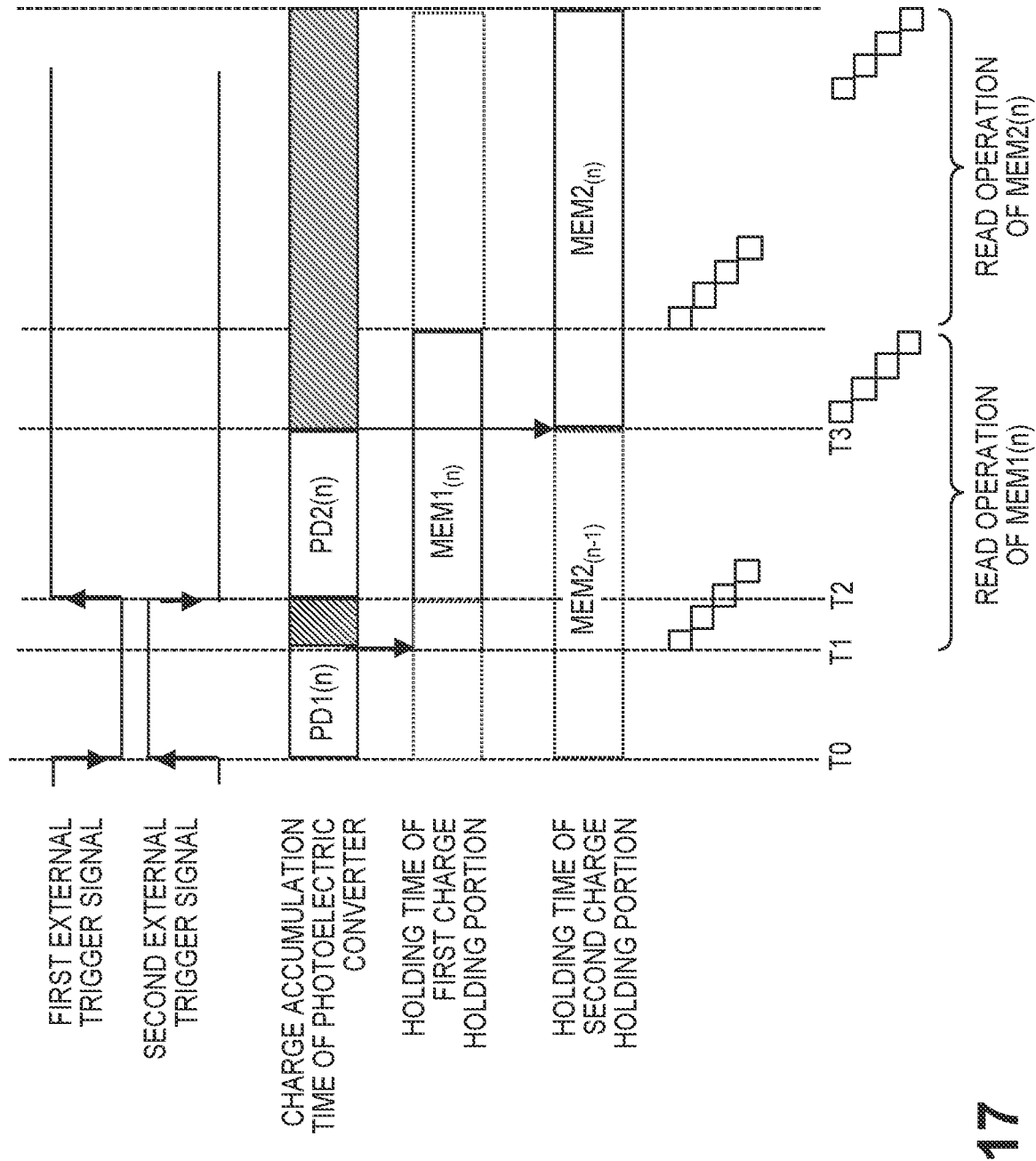
FIG. 17 is a timing chart conceptually showing the operation of an image sensing device according to the sixth embodiment.

An image sensing device according to the sixth embodiment of the present invention will be described with reference to FIG. 17. The sixth embodiment is a modification of the second embodiment, and matters that are not mentioned as the sixth embodiment can comply with the second embodiment. However, matters described in the sixth embodiment may be applied to the image sensing devices ISD according to the first and third to fifth embodiments. In the sixth embodiment, a first external trigger signal supplied to a first external trigger terminal 106 and a second external trigger signal supplied to a second external trigger terminal 107 are complementary signals.

In the sixth embodiment, at time T0, a control circuit 105 detects the trailing edge of the first external trigger signal supplied to the first external trigger terminal 106 and the leading edge of the second external trigger signal supplied to the second external trigger terminal 107 and generates a first trigger pulse. Then, the control circuit 105 causes a photoelectric converter 1 to start accumulating charges with reference to the first trigger pulse. At time T1, the control circuit 105 causes the photoelectric converter 1 to transfer charges PD1(n) accumulated in it during the period from time T0 to time T1 to a first charge holding portion 2 and causes the first charge holding portion 2 to hold the charges. This transfer is performed at once in all pixels 20 of a pixel array 100. In FIGS. 16A and 16B, the charges held by the first charge holding portion 2 are represented by MEM1(n). When the transfer ends at time T1, the control circuit 105 causes the photoelectric converter 1 to discharge the charges to a power supply line 13 via an overflow transistor 14.

After the charge transfer at time T1 ends, the control circuit 105 controls a read operation such that a signal corresponding to the charges MEM1(n) whose accumulation is started in accordance with the first trigger pulse is row-sequentially read out from the first charge holding portion 2. The read operation is performed by controlling a vertical scanning circuit 101, a column amplifier circuit 102, a horizontal scanning circuit 103, and an output circuit 104 by the control circuit 105.

At time T2, the control circuit 105 detects both the leading edge of the first external trigger signal supplied to the first external trigger terminal 106 and the trailing edge of the second external trigger signal supplied to the second external trigger terminal 107 and generates a second trigger pulse. Then, the control circuit 105 causes the photoelectric converter 1 to start accumulating charges with reference to the second trigger pulse. At time T3, the control circuit 105 causes the photoelectric converter 1 to transfer charges PD2(n) accumulated in it during the period from time T2 to time T3 to a second charge holding portion 3 and causes the second charge holding portion 3 to hold the charges. This transfer is performed at once in all pixels 20 of the pixel array 100.

At time T4, the read operation of the signal corresponding to the charges MEM1(n) ends, and the read operation of the signal corresponding to charges MEM2(n) starts next.

According to the sixth embodiment, when the complementary signals are used as the external trigger signals, noise resistance can be improved.

Figure 18:
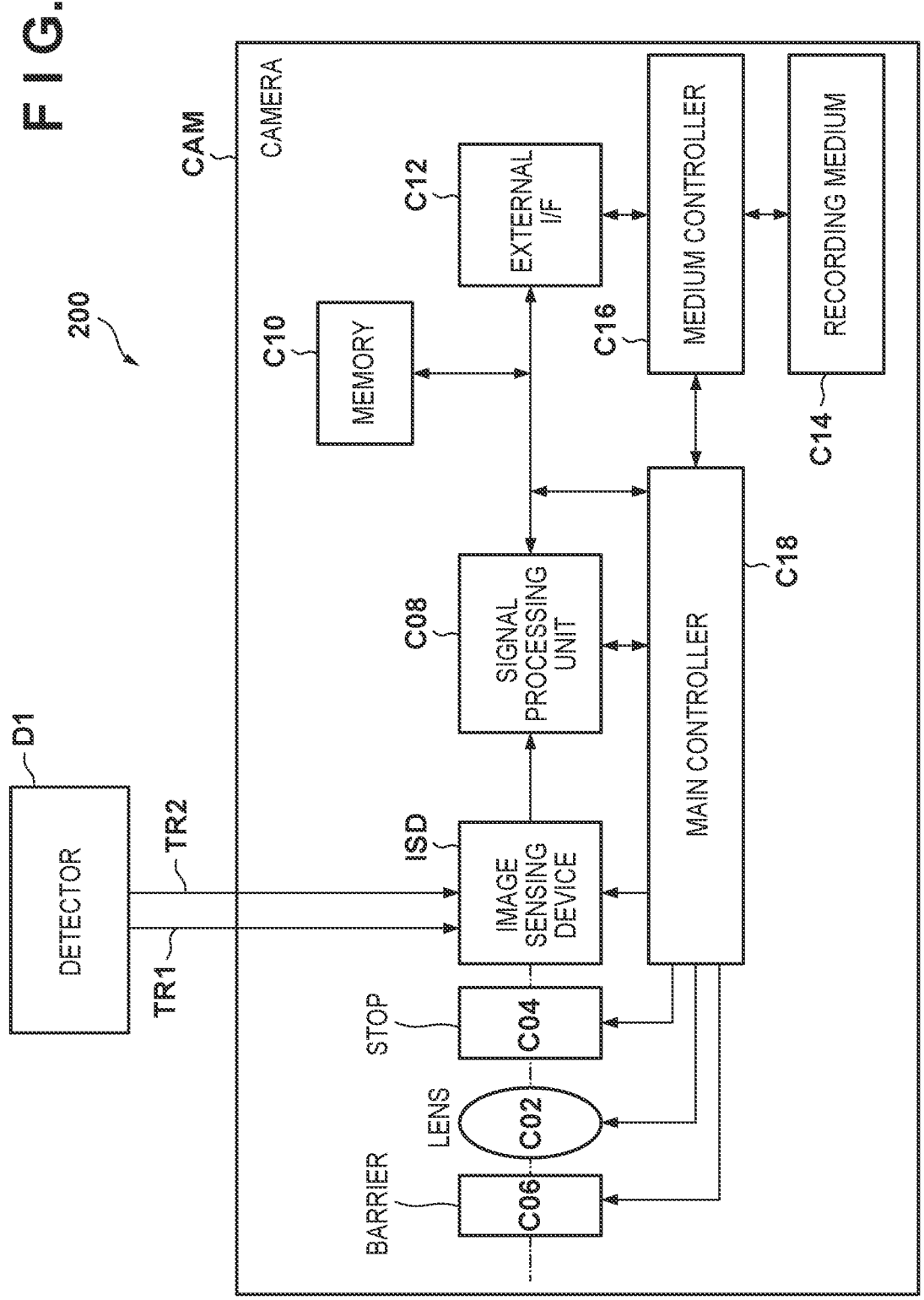
FIG. 18 is a block diagram showing the arrangement of an image sensing system according to an embodiment of the present invention.

FIG. 18 shows the arrangement of an image sensing system 200 according to an embodiment of the present invention. The image sensing system 200 can include a detector D1 and a camera CAM. Alternatively, the image sensing system 200 can include the detector D1 and the image sensing device ISD. The detector D1 detects an object and generates, as the first external trigger signal EXTTRG1 and the second external trigger signal EXTTRG2 described above, detection signals TR1 and TR2 representing that the object is detected. Alternatively, the detector D1 may be configured to detect an object and generate, as an external trigger signal EXTTRG described above, a detection signal TR representing that the object is detected. The detector D1 can include, for example, a sensor such as a loop coil, a magnetic sensor, a photoelectric converter sensor, or an ultrasonic sensor configured to detect an object such as an automobile. Alternatively, the detector D1 can include a sensor such as a photointerrupter configured to detect an object on a conveyor. The detector D1 can be configured to, for example, generate the first detection signal TR1 (first external trigger signal EXTTRG1) upon detecting one object and generate the second detection signal TR2 (second external trigger signal EXTTRG2) upon detecting one more object. Alternatively, the detector D1 can be configured to invert the logic level of the detection signal TR (external trigger signal EXTTRG) upon detecting one object and further invert the logic level of the detection signal TR (external trigger signal EXTTRG) upon detecting one more object.

The camera CAM can be any device having an image sensing function. The camera CAM can include constituent elements shown in FIG. 18 in addition to the image sensing device ISD. The camera CAM can include a lens C02 that forms an optical image of an object on the imaging plane of the image sensing device ISD. In addition, the camera CAM can include a stop C04 configured to change the amount of light passing through the lens C02, and a barrier C06 configured to protect the lens C02. The image sensing device ISD converts the optical image formed by the lens C02 into image data.

The camera CAM can also include a signal processing unit C08 that processes an output signal output from the image sensing device ISD. The signal processing unit C08 can perform, for example, correction, processing, compression, and the like of the image data. The camera CAM can include a memory C10 configured to temporarily store image data, and an external interface (external I/F) C12 configured to communicate with an external computer or the like. The camera CAM can also include a recording medium C14 such as a semiconductor memory used to record image data, and a medium controller C16 configured to record image data in the recording medium C14 and read out image data from the recording medium C14. The recording medium C14 may stationarily be provided in the camera CAM or may be detachable. The camera CAM can include a main controller C18 that controls the constituent elements of the camera CAM. The first detection signal TR1 and the second detection signal TR2 serving as the first external trigger signal EXTTRG1 and the second external trigger signal EXTTRG2 can be supplied from the detector D1 to the image sensing device ISD. The image sensing device ISD can perform image sensing in accordance with the first detection signal TR1 and the second detection signal TR2.

An example of the image sensing system is a monitoring camera. In the monitoring camera used for an application purpose of security, monitoring, or the like, the detector D1 detects the occurrence of an event (an approach or occurrence of an object of interest (a person, an animal, an object, a moving apparatus, an abnormal phenomenon, or the like)). As the result of the detection, the external trigger signals TR1 and TR2 are output to the image sensing device ISD. Another example of the image sensing system is an industrial camera. An application purpose of the industrial camera is monitoring of products conveyed through a production line. In this industrial camera, the detector D1 detects the occurrence of an event (an approach of a product, an occurrence of an abnormal phenomenon, or the like). As the result of the detection, the external trigger signals TR1 and TR2 are output to the image sensing device ISD.

As described above, when the plurality of external trigger signals are used, the interval between image sensing and image sensing can be shortened as compared to a case in which one external trigger signal is used. This makes it possible to quickly sense each of the occurrences of a plurality of events such as a plurality of moving apparatuses that move at a high speed, a plurality of products, and a continuous occurrence of a plurality of abnormal phenomena.

Figure 19A:
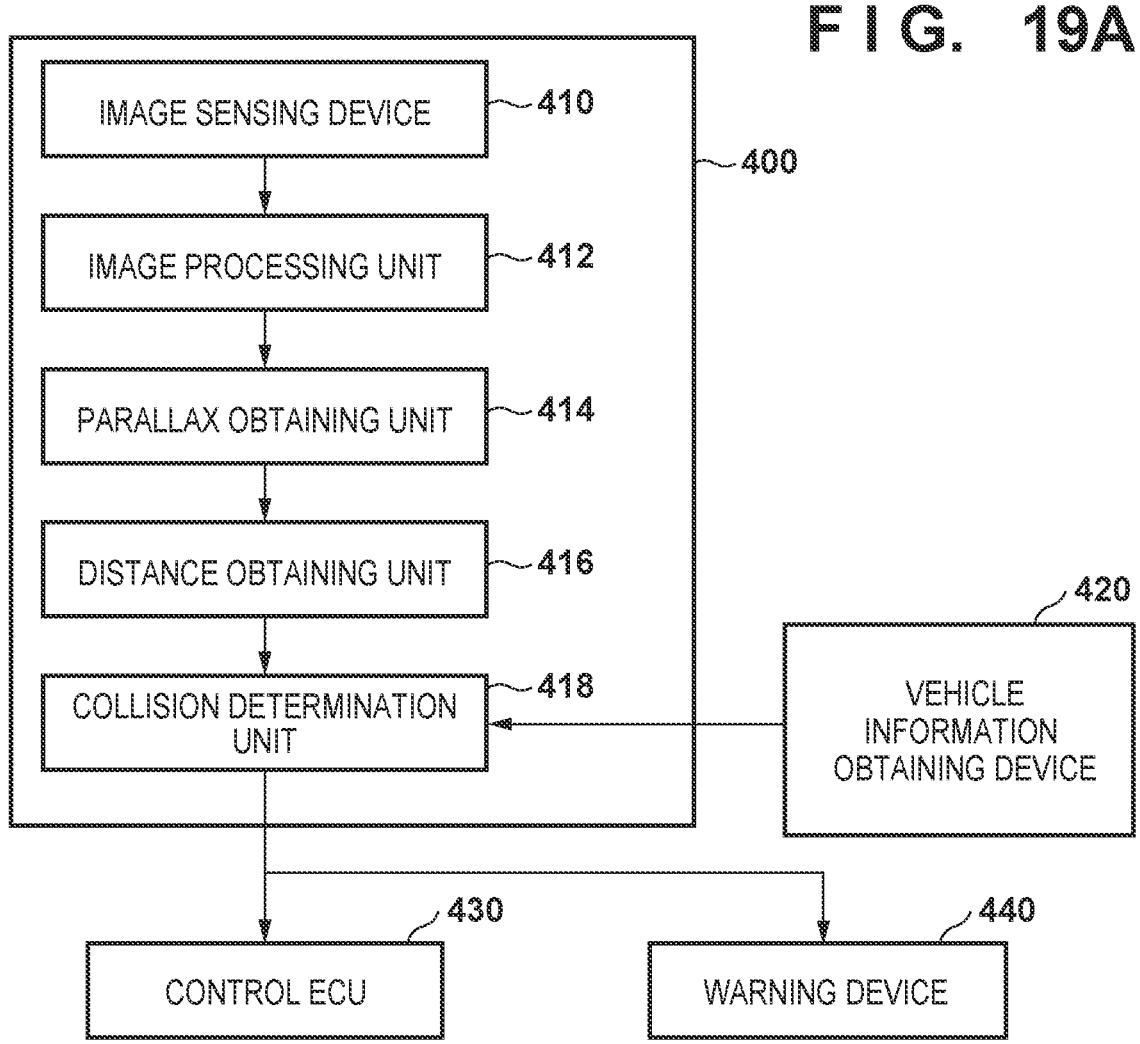
FIGS. 19A and 19B are views showing the arrangement of a moving apparatus according to an embodiment of the present invention.
Figure 19B:
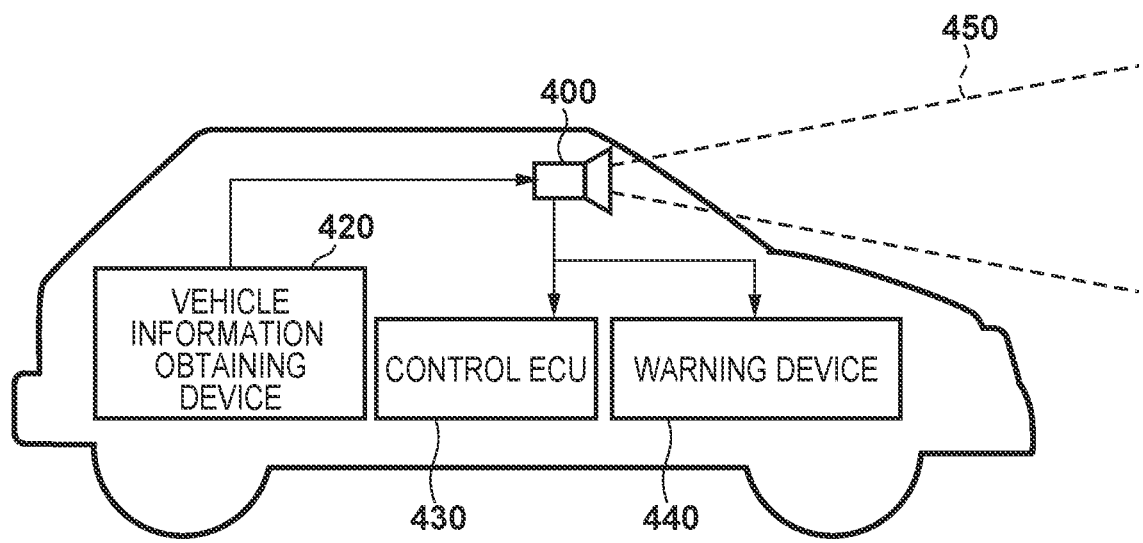

An image sensing system and a moving apparatus according to the seventh embodiment will be described with reference to FIGS. 19A and 19B. FIGS. 19A and 19B are views showing examples of the arrangements of the image sensing system and the moving apparatus according to this embodiment.

FIG. 19A shows an example of an image sensing system 400 concerning an onboard camera. The image sensing system 400 includes an image sensing device 410. The image sensing device 410 is one of the image sensing devices described in the above embodiments. The image sensing system 400 includes an image processing unit 412 that performs image processing for a plurality of image data obtained by the image sensing device 410, and a parallax obtaining unit 414 that obtains a parallax (the phase difference of a parallax image) from the plurality of image data obtained by the image sensing device 410. The image sensing system 400 includes a distance obtaining unit 416 that obtains the distance to a target object based on the obtained parallax, and a collision determination unit 418 that determines based on the obtained distance whether there is a collision possibility. Here, the parallax obtaining unit 414 and the distance obtaining unit 416 are examples of a distance information obtaining unit that obtains the distance information to a target object. That is, the distance information is information about a parallax, a defocus amount, a distance to a target object, or the like. The collision determination unit 418 may determine the collision possibility using one of these pieces of distance information. The distance information obtaining unit may be implemented by specially designed hardware or may be implemented by a software module. Alternatively, the distance information obtaining unit may be implemented by an FPGA (Field Programmable Gate Array), an ASIC (Application Specific Integrated Circuit), or the like or may be implemented by a combination thereof.

The image sensing system 400 is connected to a vehicle information obtaining device 420 and can obtain vehicle information such as a vehicle speed, a yaw rate, a steering angle, and the like. The image sensing system 400 is also connected to a control ECU 430 that is a control device configured to output a control signal to generate a braking force to the vehicle based on the determination result of the collision determination unit 418. That is, the control ECU 430 is an example of a moving apparatus controller that controls a moving apparatus based on distance information. In addition, the image sensing system 400 is also connected to a warning device 440 that generates a warning to the driver based on the determination result of the collision determination unit 418. For example, if the collision possibility is high as the determination result of the collision determination unit 418, the control ECU 430 performs vehicle control to avoid a collision or reduce damage by, for example, applying the brake, returning the accelerator, or suppressing the engine output. The warning device 440 warns the user by, for example, generating a warning sound or the like, displaying warning information on the screen of a car navigation system or the like, or giving a vibration to a seat belt or steering wheel.

In this embodiment, the image sensing system 400 senses the periphery, for example, the front or rear of the vehicle. FIG. 19B shows the image sensing system 400 in a case in which the front of the vehicle (image sensing range 450) is sensed. The vehicle information obtaining device 420 sends an instruction to operate the image sensing system 400 and execute image sensing. When one of the image sensing devices of the above-described embodiments is used as the image sensing device 410, the image sensing system 400 according to this embodiment can improve the accuracy of distance measurement.

In addition, as an output unit that outputs an external trigger signal to the image sensing device 410, one or some of the parallax obtaining unit 414, the distance obtaining unit 416, the collision determination unit 418, and the vehicle information obtaining device 420 can be used. For example, in a case in which the front of a moving apparatus is sensed, the external trigger signal may be output to the image sensing device 410 when one or some of the parallax obtaining unit 414, the distance obtaining unit 416, the collision determination unit 418, and the vehicle information obtaining device 420 detect the approach of a person or another moving apparatus.

An example in which control is performed not to cause a collision against another vehicle has been described above. However, the image sensing system can also be applied to control for automated driving following another vehicle or automated driving without deviation from a lane. The image sensing system can be applied not only to a vehicle such as a self-vehicle but also to, for example, a moving apparatus such as a ship, an airplane, or an industrial robot. In addition, the image sensing system can also be applied not only to a moving apparatus but also to a device that widely uses object recognition, such as Intelligent Transport Systems (ITS).

Modified Embodiments

In addition to the above-described embodiments, various modifications can be made for the present invention.

For example, an example in which some components of an embodiment are added to another embodiment and an example in which the components are replaced with some components of another embodiment are also included in the embodiments of the present invention.

In addition, the circuit arrangement of the pixel 12 or the column read circuit 30 is not limited to that shown in FIG. 2 and can appropriately be changed. For example, each pixel 12 may include a plurality of photoelectric converters PD.

Furthermore, in the above-described embodiments, an RGBW 12 array has been described as a color filter array. However, the color filters need not always have the RGBW 12 array. For example, color filters having an RGBW array in which the ratio of W pixels is different, for example, an RGBW 8 array may be used. Alternatively, color filters having have a CMYW array including C pixels with cyan CFs, M pixels with magenta CFs, Y pixels with yellow CFs, and W pixels may be used.

In addition, the image sensing system shown in each of the third and fourth embodiments exemplifies an image sensing system to which the image sensing device according to the present invention can be applied. The image sensing system to which the image sensing device according to the present invention can be applied is not limited to the arrangement shown in FIGS. 18, 19A, and 19B.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-246399, filed Dec. 22, 2017, which is hereby incorporated by reference herein in its entirety.

What is claimed is:

1. An image sensing device comprising:
a plurality of pixels;
a receiver configured to perform signal reception from a sensor which is different from the image sensing device; and
a control circuit configured to generate (1) a first signal which gives a first timing based on one of (a) a leading edge of a signal received by the receiver from the sensor and (b) a trailing edge of a signal received by the receiver from the sensor and (2) a second signal which gives a second timing based on the other of the leading edge and the trailing edge,
wherein each of the plurality of pixels includes a photoelectric converter, a first charge holding portion configured to hold charges generated by the photoelectric converter, and a second charge holding portion configured to hold charges generated by the photoelectric converter, and
wherein in each of the plurality of pixels, the charges whose accumulation is started in the photoelectric converter in accordance with the first signal are held by the first charge holding portion, and the charges whose accumulation is started in the photoelectric converter in accordance with the second signal are held by the second charge holding portion.

2. The device according to claim 1, wherein each of the plurality of pixels includes a first transfer portion configured to transfer the charges in the photoelectric converter to the first charge holding portion, a second transfer portion configured to transfer the charges held by the first charge holding portion to the second charge holding portion, a pixel output portion, and a third transfer portion configured to transfer the charges held by the second charge holding portion to the pixel output portion.

3. The device according to claim 2, wherein after a signal corresponding to the charges held by the second charge holding portion is read out, the charges held by the first charge holding portion are transferred to the second charge holding portion by the second transfer portion, and a signal corresponding to the charges transferred to the second charge holding portion is read out.

4. The device according to claim 1, wherein each of the plurality of pixels includes a first transfer portion configured to transfer the charges in the photoelectric converter to the first charge holding portion, a second transfer portion configured to transfer the charges in the photoelectric converter to the second charge holding portion, a pixel output portion, a third transfer portion configured to transfer the charges held by the first charge holding portion to the pixel output portion, and a fourth transfer portion configured to transfer the charges held by the second charge holding portion to the pixel output portion.

5. The device according to claim 4, wherein in a case in which the second timing is given by the second signal before a signal corresponding to the charges held by the first charge holding portion is read out, the accumulation of the charges is started in the photoelectric converter in accordance with the second timing.

6. The device according to claim 1, wherein the receiver includes a first terminal configured to receive, from the sensor, a first trigger signal upon which is based the first signal, and a second terminal configured to receive, from the sensor, a second trigger signal upon which is based the second signal.

7. The device according to claim 5, wherein the receiver includes a first terminal configured to receive, from the sensor, a first trigger signal upon which is based the first signal, and a second terminal configured to receive, from the sensor, a second trigger signal upon which is based the second signal.

8. The device according to claim 1, further comprising a synchronization signal terminal configured to receive a synchronization signal from the outside,
wherein a signal corresponding to the charges held by the first charge holding portion and a signal corresponding to the charges held by the second charge holding portion are read out in accordance with the synchronization signal.

9. The device according to claim 1, wherein each of the plurality of pixels performs a global electronic shutter operation.

10. The device according to claim 1, wherein each of the plurality of pixels performs a rolling shutter operation.

11. The device according to claim 1, wherein the receiver receives trigger signals from the sensor, and
wherein the trigger signals are complementary signals.

12. An image sensing system comprising:
an image sensing device according to claim 1,
wherein the sensor is included in the system,
wherein the sensor is configured to detect an occurrence of an event and to generate a detection signal, and
wherein the receiver receives the detection signal from the sensor.

13. The system according to claim 12, wherein the occurrence of the event is approach of an object.

14. A moving apparatus comprising:
an image sensing device according to claim 1;
an obtaining unit configured to obtain distance information up to a target object from a parallax image based on a signal output from each pixel of the image sensing device; and
a controller configured to control the target object based on the distance information,
wherein the sensor is included in the apparatus,
wherein the sensor is configured to detect an event and to generate a detection signal, and
wherein the receiver receives the detection signal from the sensor.

15. The apparatus according to claim 14, wherein an occurrence of the event is approach of an object.

16. A system comprising:
an image sensing device according to claim 1,
wherein the sensor is included in the system, and wherein the sensor is configured to generate a signal independently from an image obtained by the image sensing device, the signal being received by the receiver.

17. A system comprising:
an image sensing device according to claim 1,
wherein the sensor is included in the system, and
wherein the sensor is configured to detect an object independently from an image obtained by the image sensing device and to generate a signal in accordance with the detection, the signal being received by the receiver.

18. A system comprising:
an image sensing device according to claim 1,
wherein the sensor is included in the system, and
wherein the sensor comprises a loop coil, a magnetic sensor, or an ultrasonic sensor.

\* \* \* \* \*